United States Patent
Schubert et al.

(10) Patent No.: US 11,621,784 B1
(45) Date of Patent: Apr. 4, 2023

(54) PHOTONIC INTEGRATED CIRCUIT WITH OPTICAL DEINTERLEAVER

(71) Applicant: X Development LLC, Mountain View, CA (US)

(72) Inventors: Martin Schubert, Mountain View, CA (US); Ian Alexander Durant Williamson, Palo Alto, CA (US); Alfred Ka Chun Cheung, Belmont, CA (US)

(73) Assignee: X Development LLC, Mountain View, CA (US)

( * ) Notice: Subject to any disclaimer, the term of this patent is extended or adjusted under 35 U.S.C. 154(b) by 0 days.

(21) Appl. No.: 17/489,640

(22) Filed: Sep. 29, 2021

(51) Int. Cl.
*H04J 14/02* (2006.01)
*H04B 10/70* (2013.01)

(52) U.S. Cl.
CPC ............ *H04B 10/70* (2013.01); *H04J 14/02* (2013.01)

(58) Field of Classification Search
CPC ...... H04B 10/70; H04J 14/02; H04J 14/0208; H04J 14/0209; H04J 14/0213; H04J 14/0205
USPC .................................. 398/79, 81, 84, 85, 87
See application file for complete search history.

(56) References Cited

U.S. PATENT DOCUMENTS

| | | |
|---|---|---|
| 6,268,951 B1 | 7/2001 | Chen et al. |
| 6,275,322 B1 | 8/2001 | Tai |
| 6,342,968 B1 | 1/2002 | Tai |
| 6,922,277 B2 | 7/2005 | Moon et al. |
| 6,996,302 B2 | 2/2006 | Hamada |
| 7,305,188 B2 | 12/2007 | Yamashita et al. |
| 7,751,658 B2 | 7/2010 | Welch et al. |
| 8,280,254 B2 | 10/2012 | Doerr |
| 8,494,369 B2 | 6/2013 | Mitchell et al. |
| 10,686,526 B2 | 6/2020 | Mekis et al. |
| 10,862,610 B1 | 12/2020 | Schubert et al. |
| 2002/0110306 A1 | 8/2002 | Hamada |

(Continued)

FOREIGN PATENT DOCUMENTS

EP 0762690 B1 7/2006

OTHER PUBLICATIONS

U.S. Appl. No. 17/236,822, filed Apr. 21, 2021, 80 pages.

(Continued)

*Primary Examiner* — Hibret A Woldekidan
(74) *Attorney, Agent, or Firm* — Christensen O'Connor Johnson Kindness PLLC

(57) ABSTRACT

A photonic integrated circuit comprises an optical deinterleaver, including an input region, a dispersive region, and at least two output regions. The input region is adapted to receive an input optical signal including a plurality of channels. The dispersive region is optically coupled to the input region to receive the input optical signal. The dispersive region includes an inhomogeneous arrangement of a first material and a second material to structure the dispersive region to separate the input optical signal into a plurality of multi-channel optical signals, including a first multi-channel optical signal and a second multi-channel optical signal. The at least two output regions, include a first out region and a second output region optically coupled to the dispersive region. The first output region is positioned to receive the first multi-channel optical signal and the second output region is positioned to receive the second multi-channel optical signal.

24 Claims, 12 Drawing Sheets

(56) References Cited

U.S. PATENT DOCUMENTS

| | | | |
|---|---|---|---|
| 2003/0103265 A1* | 6/2003 | Gu | G02B 27/283 |
| | | | 359/484.04 |
| 2003/0202232 A1 | 10/2003 | Frignac et al. | |
| 2004/0018019 A1* | 1/2004 | Lacey | H04J 14/02 |
| | | | 398/82 |
| 2008/0031626 A1 | 2/2008 | Welch et al. | |
| 2011/0052189 A1 | 3/2011 | Yamada et al. | |
| 2011/0069959 A1 | 3/2011 | Chen et al. | |
| 2015/0139351 A1* | 5/2015 | Arambepola | H04L 27/2634 |
| | | | 375/295 |
| 2021/0143930 A1 | 5/2021 | Schubert et al. | |
| 2021/0149109 A1 | 5/2021 | Schubert et al. | |

OTHER PUBLICATIONS

International Search Report and Written Opinion, dated Oct. 5, 2022, in International Patent Application No. PCT/US2022/033386, 10 pages.

* cited by examiner

110

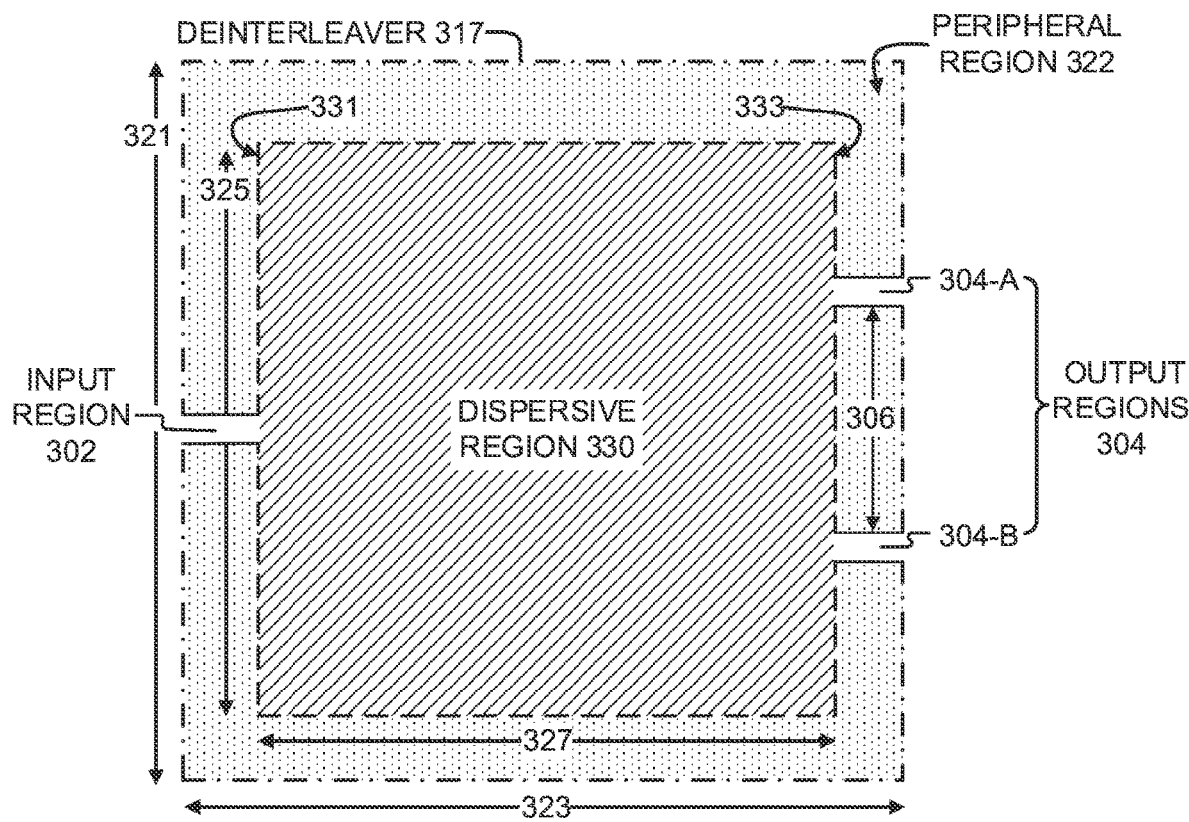
FIG. 3A
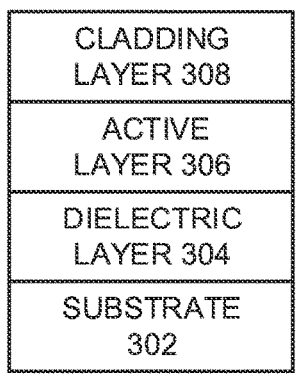 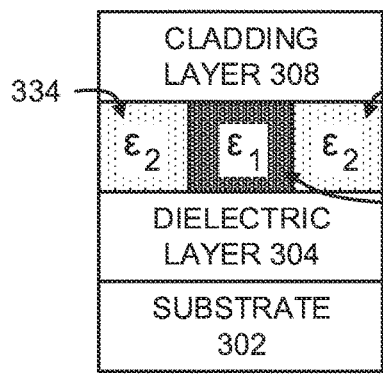 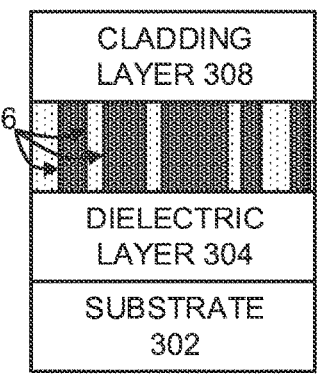
FIG. 3B　　　FIG. 3C　　　FIG. 3D

430

PHOTONIC INTEGRATED CIRCUIT WITH OPTICAL DEINTERLEAVER

TECHNICAL FIELD

This disclosure relates generally to photonic devices, and in particular but not exclusively, relates to photonic integrated circuits.

BACKGROUND INFORMATION

Fiber-optic communication is typically employed to transmit information from one place to another via light that has been modulated to carry the information. For example, many telecommunication companies use optical fibers to transmit telephone signals, internet communication, and cable television signals. But the cost of deploying optical fibers for fiber-optic communication may be prohibitive. As such, techniques have been developed to more efficiently use the bandwidth available within a single optical fiber. Wavelength-division multiplexing is one such technique that bundles multiple optical carrier signals onto a single optical fiber using different wavelengths.

Wavelength division multiplexing and its variants (e.g., dense wavelength division multiplexing, coarse wavelength division multiplexing, and the like) take advantage of the bandwidth of optical fibers by bundling multiple optical carrier signals onto a single optical fiber. Once the multiple carrier signals are bundled together, they are transmitted from one place to another over the single optical fiber where they may be demultiplexed such that the bundled optical carrier signals may be read out individually.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. Not all instances of an element are necessarily labeled so as not to clutter the drawings where appropriate. The drawings are not necessarily to scale, emphasis instead being placed upon illustrating the principles being described.

FIGS. 3A-3D illustrate example views of a dispersive region included in an optical deinterleaver, in accordance with an embodiment of the present disclosure.

DETAILED DESCRIPTION

Figure 1A:
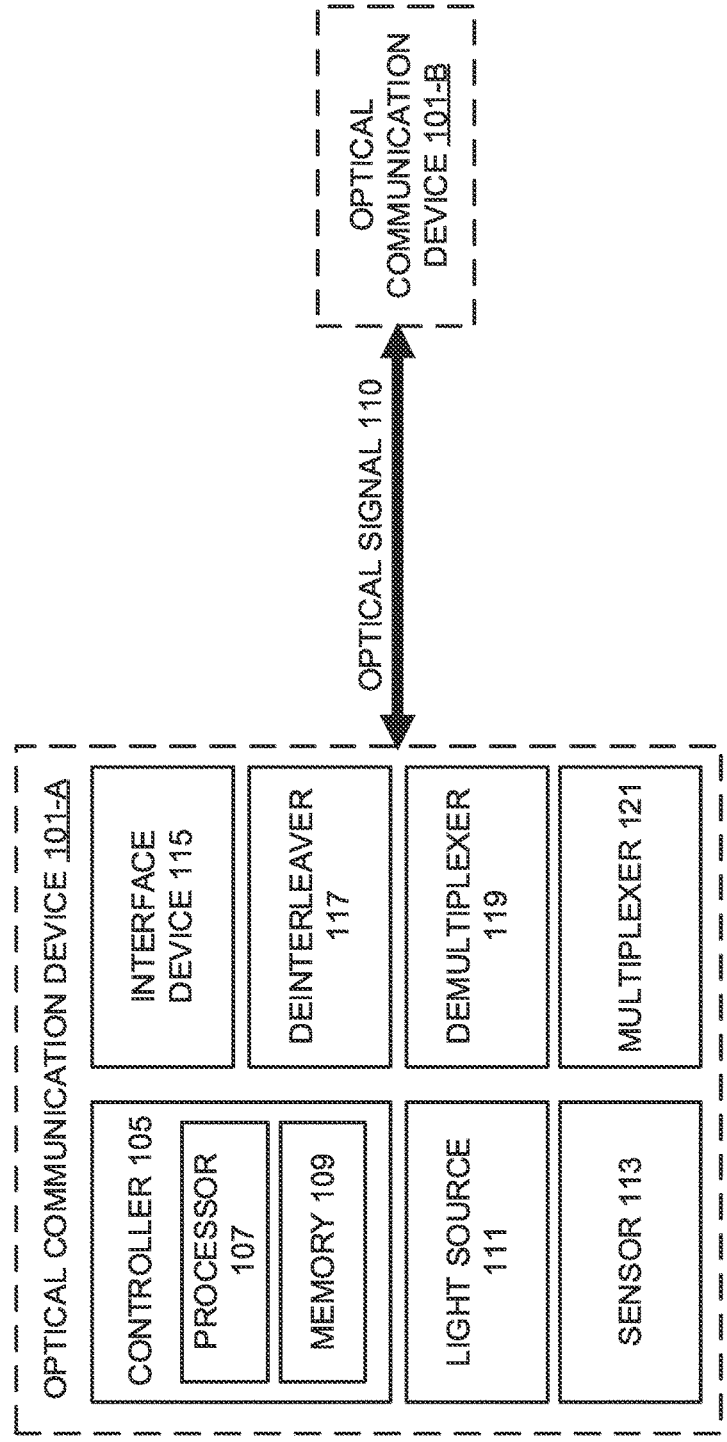
FIG. 1A is a functional block diagram illustrating a system for optical communication between two optical communication devices via an optical signal, in accordance with an embodiment of the present disclosure.

Embodiments of photonic integrated circuits, including an optical deinterleaver, as well as a method for generating a design of photonic integrated circuits are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As functionality of photonic devices increases and manufacturing tolerances improve to allow for smaller device feature sizes, it becomes increasingly important to take full advantage of these improvements via optimized device design to enhance device functionality, performance, and robustness while also reducing size and cost. Conventional photonic devices, such as those used for optical communication, are traditionally designed using a simple guess and check method or manually guided grid-search in which a small number of design parameters from pre-determined designs or building blocks are adjusted or arranged for suitability to a particular application. However, in actuality, these devices may have design parameters ranging from hundreds to billions or more depending on device size and functionality.

Described herein are embodiments of photonic integrated circuits (e.g., one or more optical deinterleavers, demultiplexers, filters, or combinations thereof) that may have a design obtainable by an inverse design process utilizing first-principles simulations to allow for consideration of increased design parameters relative to conventional photonic design. More specifically, techniques described herein may utilize gradient-based optimization in combination with the first-principles simulations to generate a design based on the underlying physics that are expected to govern the operation of the photonic integrated circuit. However, it is appreciated in other embodiments design optimization of photonic integrated circuits without gradient-based techniques may also be used. Advantageously, embodiments and techniques described herein are not limited to conventional techniques for design of photonic circuits. Rather, the first-principles based methodology described herein may result in designs which outstrip current state-of-the-art designs in performance, size, robustness, or a combination thereof. Further still, rather than being limited to a small number of design parameters due to conventional techniques, the embodiments and techniques described herein may provide scalable optimization of a nearly unlimited number of design parameters.

To facilitate further design optimization and improve performance of inverse designed photonic integrated circuits, embodiments of the disclosure describe photonic integrated circuits that incorporate one or more optical deinterleavers. Optical deinterleavers, defined herein, correspond to a photonic device (e.g., as a distinct device or as a component of a monolithic photonic integrated circuit) that, in response to receiving an input signal including a plurality of channels (e.g., a broadband optical signal with a total number of channels of at least four), outputs a plurality of multi-channel optical signals that are spatially separated from one another. Each of the plurality of multi-channel optical signals include at least two channels separated from the input signal within a dispersive region of the optical deinterleaver. In some embodiments, the dispersive region of the optical deinterleaver may be a resonator or an optical cavity that is structured to spatially direct or otherwise map individual channels included in the input signal to specific output regions that are spatially separated from one another to form the plurality of multi-channel optical signals.

It is appreciated that optical deinterleavers described in embodiments herein are different from demultiplexers. One of ordinary skill in the art will recognize that a demultiplexer outputs individually separated channels from an input optical signal, while optical deinterleavers output multi-channel optical signals. In some embodiments, a monolithic photonic integrated circuit is described in which a single optical deinterleaver is coupled to one or more demultiplexers. Advantageously, a multi-stage demultiplexing process may be enabled by first separating the input optical signal into a plurality of multi-channel optical signals with the optical deinterleaver and then separating the multi-channel optical signals into individual channels using the one or more demultiplexers. The multi-stage demultiplexing process may promote enhanced performance characteristics and simplified dispersive region design of a given photonic integrated circuit due to the increased wavelength separation distance between individual channels included in the optical signal as the individual channels propagate through the photonic integrated circuit.

FIG. 1A is a functional block diagram illustrating a system 100 for optical communication (e.g., via wavelength division multiplexing or other techniques) between two optical communication devices 101-A and 101-B via an optical signal 110, in accordance with an embodiment of the present disclosure. The optical communication device 101-A includes a controller 105, one or more light sources 111 (e.g., light emitting diodes, lasers, or the like), one or more sensors 113 (e.g., photodiodes, phototransistors, photoresistors, or the like), one or more interface devices 115 (e.g., fiber optic couplers, light guides, waveguides, other optics, or the like), one or more optical deinterleavers 117, one or more optical demultiplexers 119, and one or more optical multiplexers 121 coupled to one another. The controller 105 includes one or more processors 107 (e.g., one or more central processing units, application specific integrated circuits, field programmable gate arrays, tensor processing units, graphic processing units, or combinations thereof) and memory 109 (e.g., volatile memory such as dynamic RAM or static RAM, non-volatile memory such as flash memory, other types of memory, or combinations thereof). In some embodiments, the optical communication device 101-A may also include one or more photonic integrated circuits (see, e.g., FIGS. 2A-2E, FIGS. 3A-3D, or FIGS. 4A-4C), which may be formed from the one or more interface devices 115, the one or more optical deinterleavers 117, the one or more optical demultiplexers 119, or combinations thereof.

The controller 105 is configured to orchestrate operation of the optical communication device 101-A. More specifically, the controller 105 includes instructions (e.g., as software instructions stored in the memory 109 coupled to the one or more processors 107, firmware instructions stored in memory included in the one or more processors 107, and/or hardware instructions corresponding to application specific integrated circuits, field-programmable gate arrays, and the like) that when executed by the controller 105 causes the controller 105, the optical communication device 101-A, and/or the system 100 to perform operations. In some embodiments, the operations include modulating light via the one or more light sources 111 to encode information in individual channels corresponding to distinct wavelengths or modes of the modulated light, multiplexing the individual channels via the one or more multiplexers 121 to form the optical signal 110, and transmitting the optical signal 110 via the one or more interface devices 115. In the same or other embodiments, the operations include receiving the optical signal 110 via the one or more interface devices 115, demultiplexing the optical signal 110 by one or more photonic integrated circuits including the one or more optical deinterleavers 117, the one or more demultiplexers 119, other optical components, or combinations thereof, and decoding the optical signal 110 by detecting individual channels demultiplexed from the optical signal 110 via the one or more sensors 113 to extract the information.

In some embodiments optical communication devices 101-A and 101-B may be distinct and separate devices (e.g., an optical transceiver or transmitter communicatively coupled via one or more optical fibers to a separate optical transceiver or receiver). However, in other embodiments, optical communication devices 101-A and 101-B may be part of a singular component or device (e.g., a smartphone, a tablet, a computer, server, optical communication device, or the like). For example, optical communication devices 101-A and 101-B may both be constituent components on a monolithic integrated circuit that are coupled to one another via a waveguide (e.g., silicon waveguide) that is embedded within the monolithic integrated circuit and is adapted to carry the optical signal 110 between the optical communication devices 101-A and 101-B.

It is appreciated that the optical communication device 101-B may include the same or similar components as the optical communication device 101-A, which have been omitted for clarity. Additionally, it is appreciated that any functionality described in reference to the optical communication device 101-A is equally applicable to the optical communication device 101-B. It is further appreciated that the optical communication device 101-A may be configured as an optical receiver, transmitter, or transceiver and that in some embodiments certain components illustrated in FIG. 1A may be omitted from the optical communication device 101-A (e.g., depending on target functionality). For example, in one embodiment the optical communication device 101-A is configured as an optical receiver and may omit the one or more light sources 111 and the multiplexer 121. Additionally, it is noted that in some embodiments certain elements of the optical communication device 101-A may have been omitted to avoid obscuring certain aspects of the disclosure. For example, the optical communication device 101-A may include amplification circuitry, lenses, or other components to facilitate transmitting, receiving, encoding, or decoding the optical signal 110.

Figure 1B:
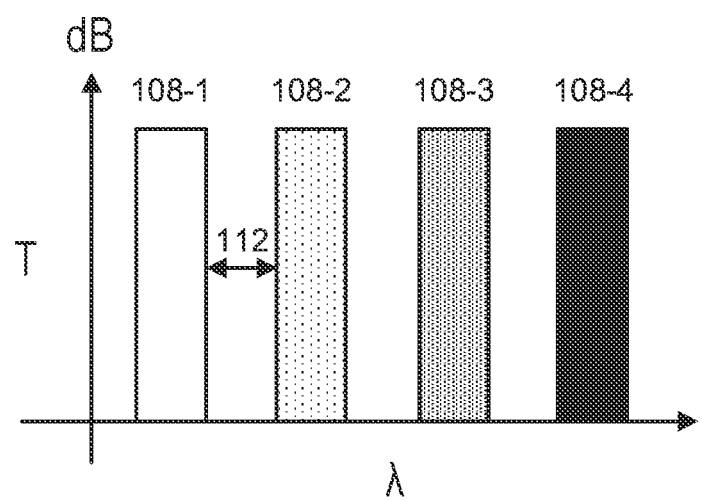
FIG. 1B illustrates the optical signal illustrated in FIG. 1A with individual channels included a plurality of channels of the optical signal arranged by wavelength, in accordance with an embodiment of the present disclosure.

FIG. 1B illustrates the optical signal 110 illustrated in FIG. 1A with the individual channels (e.g., a first channel 108-1, a second channel 108-2, a third channel 108-3, and a fourth channel 108-4) included in a plurality of channels 108 of the optical signal 110 arranged by wavelength, in accordance with an embodiment of the present disclosure. More specifically, FIG. 1B illustrates the plurality of channels 108 arranged in ascending order by wavelength ($\lambda$) with respect to transmission (T) for the optical signal 110. For example, in the illustrated embodiment, the second channel 108-2 has a larger wavelength than the wavelength of the first channel 108-1 and the third channel 108-3 has a larger wavelength than the wavelength of the second channel 108-2. In most embodiments, each channel included in the plurality of channels 108 is characterized by a distinct wavelength (e.g., a center wavelength of a respective channel) that are different from one another. In other words, the first channel 108-1 is characterized by a first center wavelength, the second channel 108-2 is characterized by a second center wavelength, the third channel 108-3 is characterized by a third center wavelength, and so on. In some embodiments, the distinct wavelengths characterizing the plurality of channels 108 are periodically spaced apart by a predefined increment 112 (e.g., 5 nm, 10 nm, 20 nm, 50 nm, or any other suitable increment). In one embodiment, the distinct wavelengths characterizing the plurality of channels 108 include 1270 nm, 1280 nm, 1290 nm, and 1300 nm. In the same or other embodiments, the distinct wavelengths characterizing the plurality of channels 108 include 1271 nm, 1291 nm, 1311 nm, 1331 nm, 1511 nm, 1531 nm, 1551 nm, 1571 nm, or otherwise. It is appreciated that only four channels are illustrated in the plurality of channels 108 of the optical signal 110, but in other embodiments there may be more or less than four channels included in the plurality of channels 108.

Figure 1C:
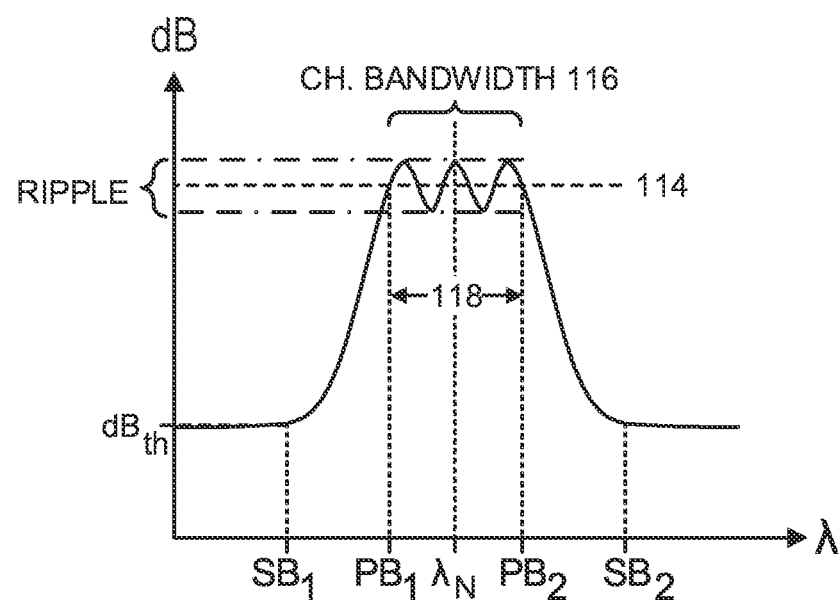
FIG. 1C illustrates an example channel, included in the optical signal illustrated in FIG. 1B, characterized by a distinct wavelength, in accordance with an embodiment of the present disclosure.

FIG. 1C illustrates an example channel (e.g., the first channel 108-1, the second channel 108-2, the third channel 108-3, the fourth channel 108-4, or otherwise), included in the optical signal 110 of FIG. 1B, characterized by a distinct wavelength, in accordance with an embodiment of the present disclosure. As illustrated, the example channel is characterized by the distinct wavelength, which corresponds to a center wavelength ($\lambda_N$) of the example channel. In some embodiments, the center wavelength is defined as the midpoint of the passband region (i.e., the region defined as being between $PB_1$ and $PB_2$) and the channel bandwidth 116 may be defined as the width of passband region 118. The passband region 118 may represent an approximate power or transmission of one or more components (e.g., optical deinterleaver, demultiplexer, or otherwise) included in a photonic integrated circuit or a collective transmission of the photonic integrated circuit. It is appreciated that in some embodiments the passband region 118 may include ripple 114 as illustrated in FIG. 1C, which corresponds to fluctuations within the passband region 118. In one or more embodiments, the ripple 114 within the passband region 118 may be +/−2 dB or less, +/−1 dB or less, +/−0.5 dB or less, or otherwise. In some embodiments, the channel bandwidth 116 may be defined by the passband region 118. In other embodiments, the channel bandwidth 116 may be defined as the wavelength range with a measured power above a threshold (e.g., $dB_{th}$).

Figure 2A:
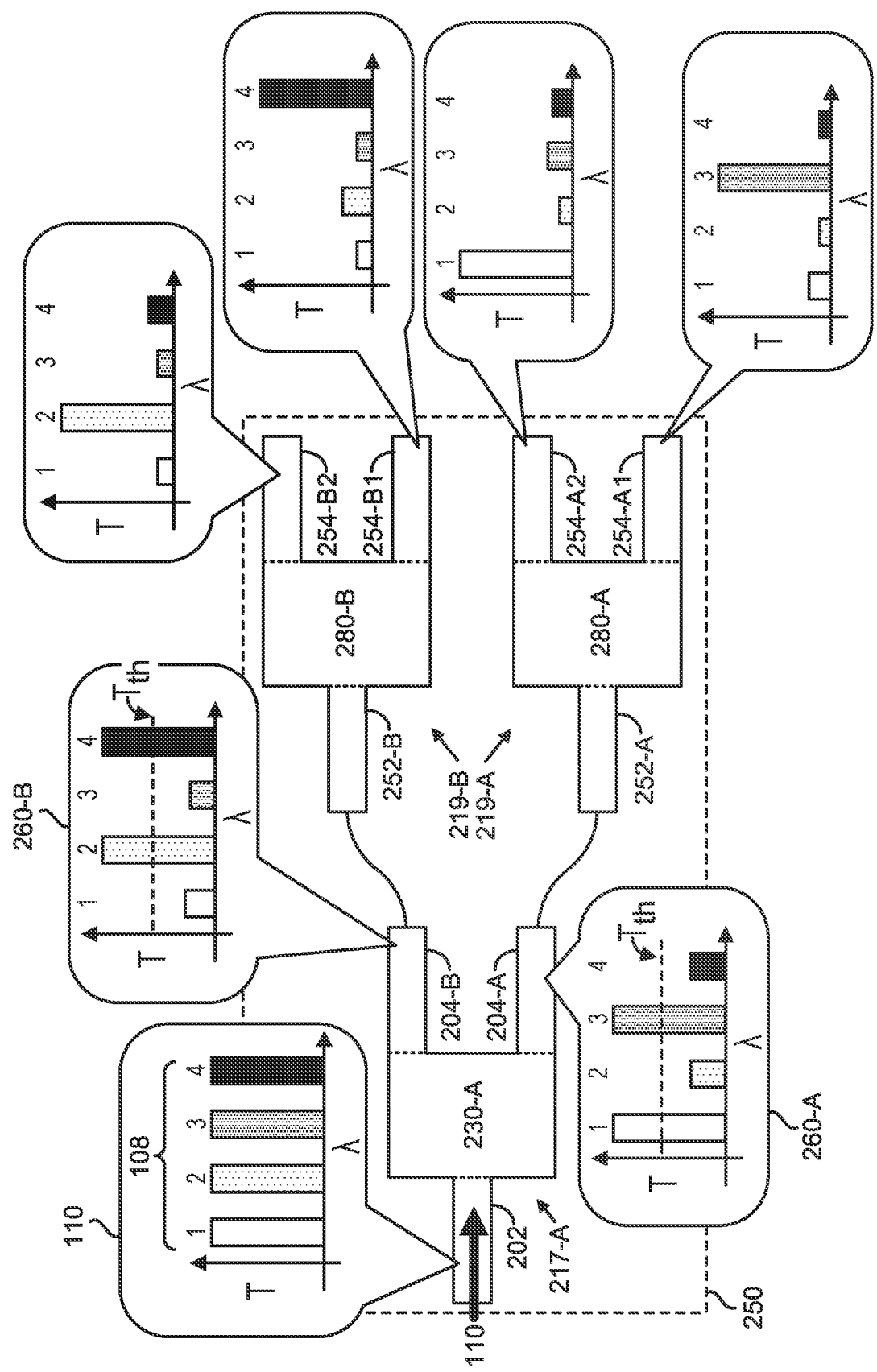
FIG. 2A illustrates an example photonic integrated circuit including an optical deinterleaver, in accordance with an embodiment of the present disclosure.

FIG. 2A illustrates an example photonic integrated circuit 250 including an optical deinterleaver 217-A, in accordance with an embodiment of the present disclosure. The photonic integrated circuit 250 implements a multi-stage demultiplexing process and includes the optical deinterleaver 217-A, a first demultiplexer 219-A, and a second demultiplexer 219-B. More specifically, the photonic integrated circuit 250 may be one possible implementation of a photonic integrated circuit included in the optical communication device 101-A illustrated in FIG. 1A. Referring back to FIG. 2A, the optical deinterleaver 217-A includes an input region 202 (e.g., a waveguide), a dispersive region 230-A, and at least two output regions 204-A and 204-B (e.g., spatially separated waveguides). The first demultiplexer 219-A and the second demultiplexer 219-B similarly include input regions (i.e., 252-A and 252-B), dispersive regions (i.e., 280-A and 280-B), and output regions (i.e., 254-A1, 254-A2, 254-B1, and 254-B2).

As illustrated, the input region 202 of the optical deinterleaver 217-A is adapted to receive the optical signal 110 including the plurality of channels 108 that are characterized by distinct wavelengths. The dispersive region 230-A is optically coupled to the input region 202 to receive the optical signal 110. The dispersive region 230-A includes an inhomogeneous arrangement of a first material and a second material (see, e.g., FIGS. 4A-4C, where the first material is different than the second material) to structure the dispersive region 230-A to separate the optical signal 110 into a plurality of multi-channel optical signals (e.g., a first multi-channel optical signal 260-A and a second multi-channel optical signal 260-B). The at least two output regions (e.g., the first output region 204-A and the second output region 204-B) are optically coupled to the dispersive region 230-A and physically separated from the input region 202. The first output region 204-A is positioned to receive the first multi-channel optical signal 260-A and the second output region 204-B is positioned to receive the second multi-channel optical signal 260-B. Additionally, it is further noted that the inhomogeneous arrangement of the first material and the second material of the dispersive region 230-A is substantially proportional to a design obtainable with an inverse design process (see, e.g., FIG. 6).

In the illustrated embodiment, the first demultiplexer 219-A is optically coupled to the first output region 204-A to demultiplex the first multi-channel optical signal 260-A into individual channels (e.g., the first channel 108-1 included in the first multi-channel optical signal 260-A is demultiplexed and directed towards output port 254-A2 and the third channel 108-3 included in the first multi-channel optical signal 260-A is demultiplexed and directed towards output port 254-A1). The second demultiplexer 219-B is optically coupled to the second output region 204-B of the optical deinterleaver 217-A to demultiplex the second multi-channel optical signal 260-B into individual channels (e.g., the second channel 108-2 included in the second multi-channel optical signal 260-B is demultiplexed and directed towards output port 254-B2 and the fourth channel 108-4 included in the second multi-channel optical signal 260-B is demultiplexed and directed towards output port 254-B1). Similar to the optical deinterleaver 217-A, the first demultiplexer 219-A and the second demultiplexer 219-B each include a respective dispersive region (e.g., 280-A and 280-B) that includes a corresponding inhomogeneous arrangement of the first material and the second material (see, e.g., FIG. 4A) to structure the respective dispersive regions 280-A and 280-B to separate the first multi-channel optical signal 260-A or the second multi-channel optical signal 260-B into individual channels included in the plurality of channels 108 of the optical signal 110. Additionally, it is further noted that the corresponding inhomogeneous arrangement of the first material and the second material of the dispersive regions 280-A and 280-B is substantially proportional to a design obtainable with an inverse design process (see, e.g., FIG. 6).

As illustrated, the dispersive region 230-A is structured to function as an optical cavity or resonator that couples individual channels with specific optical modes received at the input region 202 to a corresponding one of the at least two output regions 204. The dispersive region 230-A directs the majority of light associated with the first channel and the third channel from the input region 202 to the first output region 204-A. Simultaneously, the dispersive region 230-A also directs the majority of light associated with the second channel and the fourth channel from the input region 202 to the second output region 204-B. In such embodiments, the directed light received at a corresponding one of the at least two output regions 204 is above a threshold transmission ($T_{th}$). However, it is appreciated that there may be residual light (e.g., noise) that propagates to an unintended output region (e.g., portion of the light associated with the second and fourth channels propagates unintentionally to the first output region 204-A) with a corresponding transmission below the threshold transmission ($T_{th}$). In some embodiments, the threshold transmission may be 50%, 40%, 30%, 20%, 10%, 5%, or 1%.

Similarly, the demultiplexers 219-A and 219-B respectively include dispersive regions 280-A and 280-B, which are structured to function as an optical cavity or resonator that couples individual channels with specific modes received at the input regions 252-A and 252-B to a corresponding one of the output regions (i.e., 254-A1, 254-A2, 254-B1, and 254-B2). As illustrated, the dispersive region 280-A directs the majority of light associated with the distinct wavelength of the third channel from the input region 252-A to the output region 254-A1. Simultaneously, the dispersive region 280-A also directs the majority of light associated with the distinct wavelength of the first channel from the input region 252-A to the output region 254-A2. The dispersive region 280-B directs the majority of light associated with the distinct wavelength of the fourth channel from the input region 252-B to the output region 254-B1. Simultaneously, the dispersive region 280-B also directs the majority of light associated with the distinct wavelength of the second channel from the input region 252-B to the output region 254-B2. As noted above, the directed light received at a corresponding one of the output regions 254 is above the threshold transmission ($T_{th}$). However, it is appreciated that there may be residual light (e.g., noise) that propagates to an unintended output region (e.g., portion of the light associated with the first, second, and fourth channels propagates unintentionally to the output region 254-A1) with a corresponding transmission below the threshold transmission ($T_{th}$).

Thus, it is appreciated that the term "separate" in the context of an optical deinterleaver (e.g., optical deinterleaver 217-A or any other optical deinterleaver discussed herein) and a demultiplexer (e.g., 280-A, 280-B or any other demultiplexer discussed herein), indicates that a majority (e.g., at least 50%) of light associated the distinct wavelength of a given channel included in the optical signal 110 is directed to a corresponding output region (e.g., output regions 204 and 254). It is further appreciated that transmission is a relative term (e.g., transmission at output regions 204 is based on optical power for a given channel at the expected output region relative to optical power at the corresponding input region) for a specific component. For example, the transmission for the second channel 108-2 at the second output region 204-B is based on optical power for the second channel 108-2 at the output region 204-B relative to the optical power for the second channel 108-2 at the input region 202.

In the illustrated embodiment of FIG. 2A, the multi-stage demultiplexing process includes providing the optical signal 110 to the optical deinterleaver 217-A via the input region 202 optically coupled to the dispersive region 230-A. The multi-stage demultiplexing process further includes separating adjacent channel pairs (e.g., based on wavelength when the plurality of channels 108 are arranged by increasing or decreasing center or distinct wavelength) included in the optical signal 110 via the dispersive region 230-A and directing the separated channels to physically separated output regions (e.g., 204-A and 204-B) of the optical deinterleaver 217-A to form the first multi-channel optical signal 260-A and the second multi-channel optical signal 260-B. The multi-stage demultiplexing process additionally includes providing the first multi-channel optical signal 260-A to the first demultiplexer 219-A (e.g., via a waveguide coupling the first output region 204-A of the optical deinterleaver 217-A to the input region 252-A of the first demultiplexer 219-A) and providing the second multi-channel optical signal 260-B to the second demultiplexer 219-B (e.g., via a waveguide coupling the second output region 204-B of the optical deinterleaver 217-A to the input region of the second demultiplexer 219-B). The multi-stage demultiplexing process includes demultiplexing the first multi-channel optical signal 260-A and the second multi-channel optical signal 260-B into individual channels, respectively, via the dispersive region 280-A of the first demultiplexer 252-A and the dispersive region 280-B of the second demultiplexer 252-A such that the individual channels (e.g., $\lambda_1$, $\lambda_2$, $\lambda_3$, or $\lambda_4$) may be individually read out (e.g., via one or more optical sensors coupled to the output regions 254 of the plurality of demultiplexers 219).

Figure 2B:
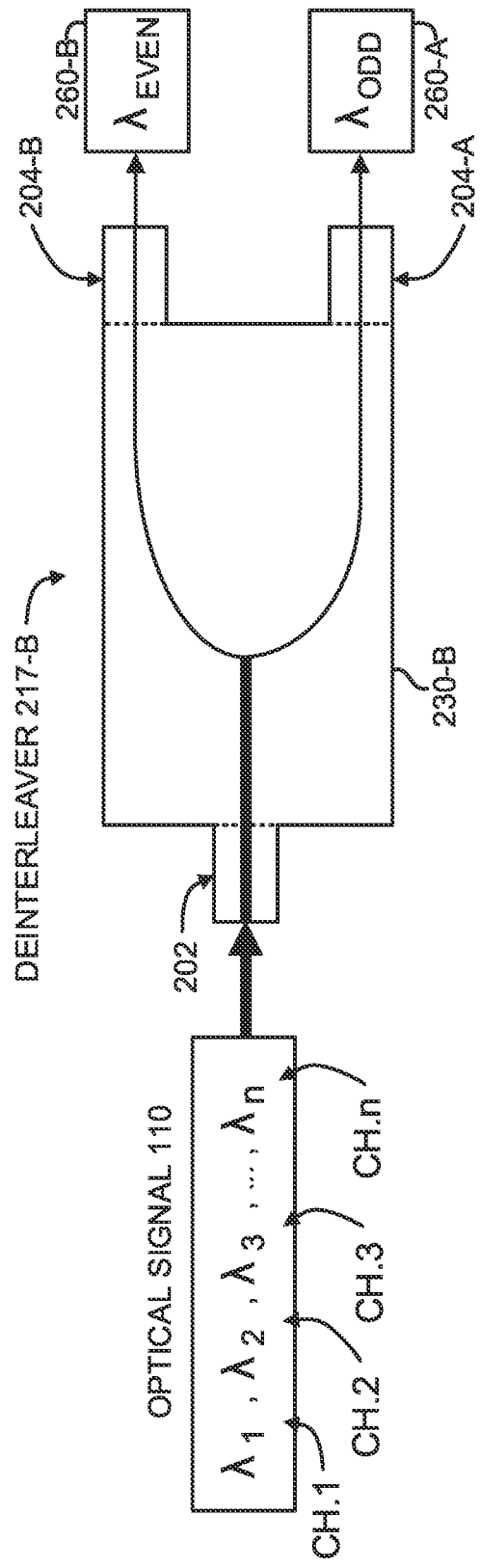
FIG. 2B illustrates an example optical deinterleaver with two output regions, in accordance with an embodiment of the present disclosure.
Figure 2C:
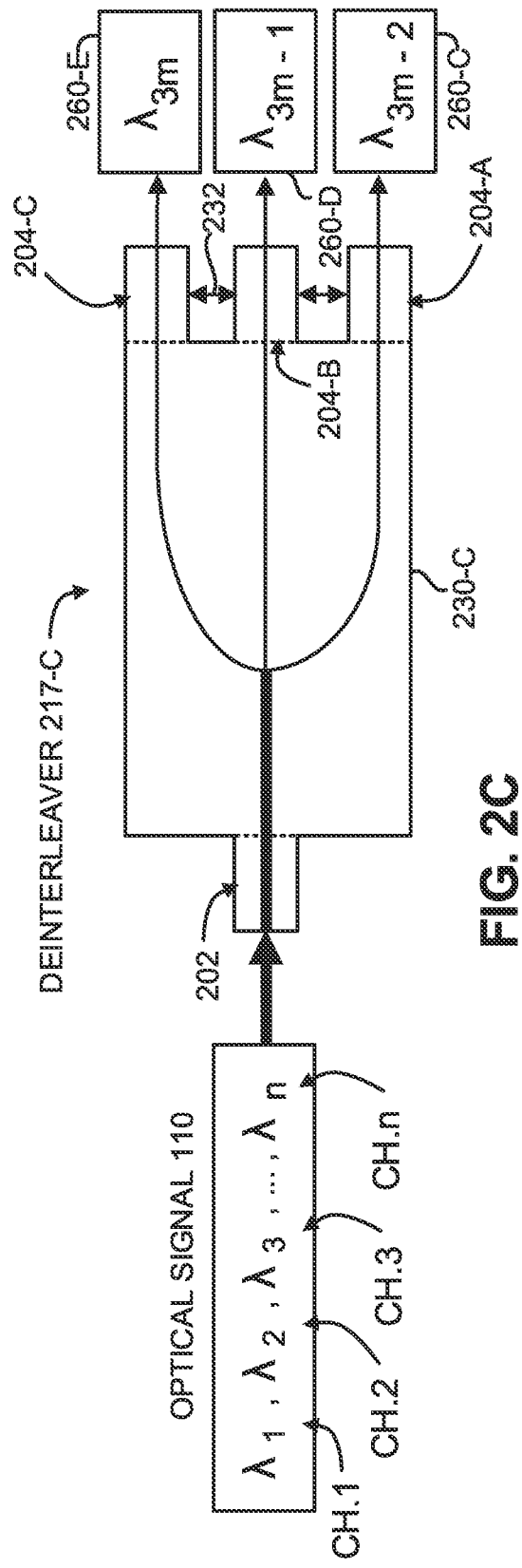
FIG. 2C illustrates an example optical deinterleaver with three output regions, in accordance with an embodiment of the present disclosure.
Figure 2D:
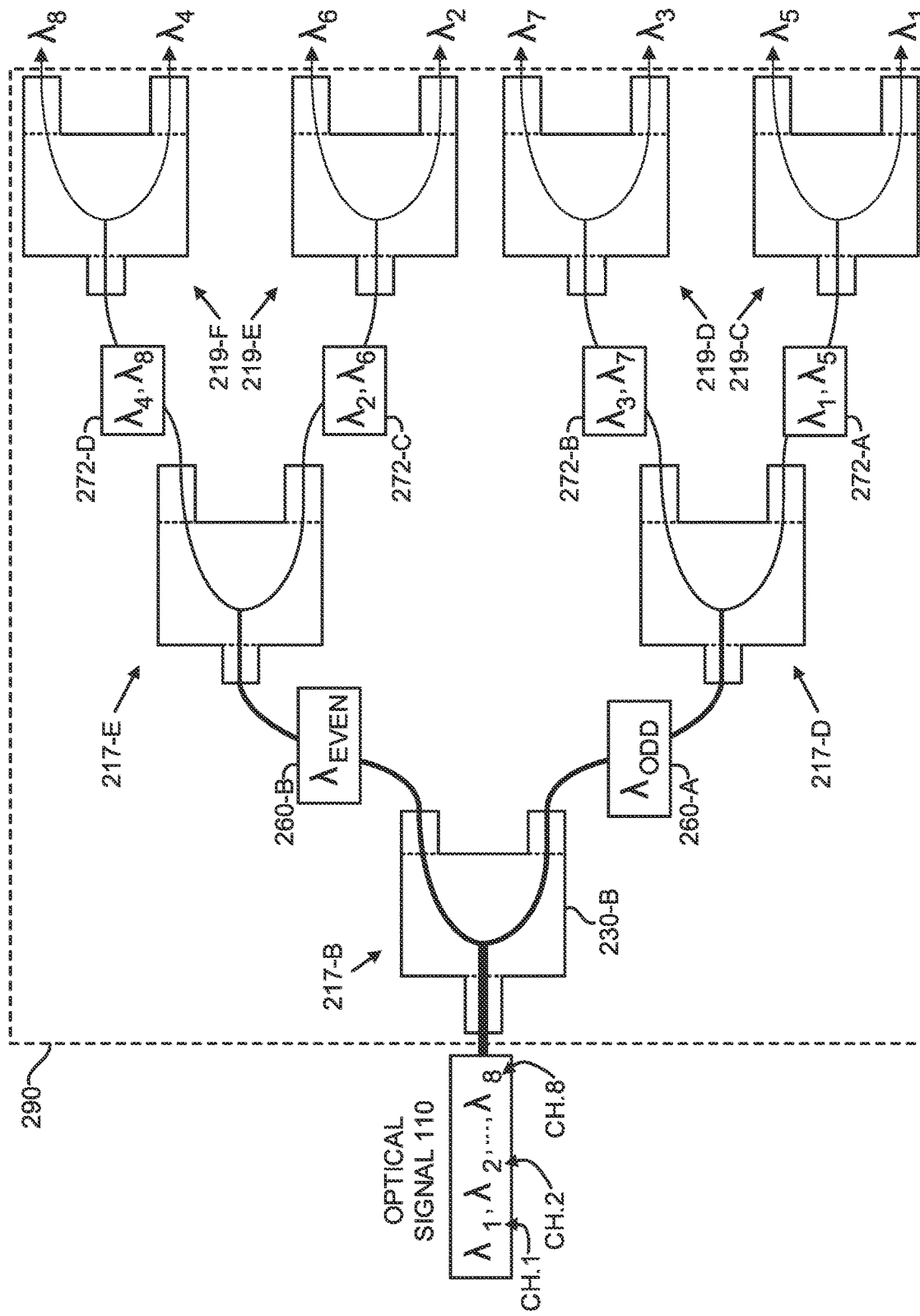
FIG. 2D illustrates an example photonic integrated circuit including an intermediary deinterleaver, in accordance with an embodiment of the present disclosure.

It is appreciated that in some embodiments the photonic integrated circuit 250 may include additional or fewer components (e.g., intermediary deinterleavers as illustrated in FIG. 2D, additional demultiplexers, or the like) depending on the optical signal 110 and the functionality of the optical deinterleaver 217-A (e.g., number of output regions 204 for the optical deinterleaver 217-A). Further still, it is appreciated that the multi-stage demultiplexing process is not limited to one (e.g., as illustrated in FIG. 2A) or two (e.g., as illustrated in FIG. 2D) deinterleaving stages. Rather, additional deinterleaving stages may be included (e.g., secondary intermediary deinterleavers, tertiary intermediary deinterleavers, and so on) depending on a target functionality of the photonic integrated circuit 250.

FIG. 2B illustrates an example optical deinterleaver 217-B with two output regions (i.e., 204-A and 204-B), in accordance with an embodiment of the present disclosure. The optical deinterleaver 217-B is an alternative embodiment to the optical deinterleaver 217-A illustrated in FIG.

2A and may be included in the optical communication device 101-A illustrated in FIG. 1A. Referring back to FIG. 2B, the optical deinterleaver 217-B represents a generalized embodiment in which the optical signal 110 includes "n" (i.e., any natural number greater than or equal to four) channels. The "n" channels, when arranged sequentially by distinct or center wavelength, includes odd-numbered channels and even-numbered channels (e.g., the first channel 108-1 is an odd channel and the second channel 108-2 is an even channel). The dispersive region 230-B is subsequently structured to direct the odd-numbered channels and the even-numbered channels to a respective one of the at least two output regions 204. For example, in the illustrated embodiment, odd-numbered channels are directed to the first output region 204-A and the even-numbered channels are directed to the second output region 204-B to respectively form the first multi-channel optical signal 260-A and the second multi-channel optical signal 260-B. Accordingly, a wavelength spacing between distinct or center wavelengths of adjacent channels included in the optical signal 110 is half of a wavelength spacing between distinct or center wavelengths of adjacent channels included in the multi-channel optical signals 260. It is appreciated that by increasing the wavelength spacing between adjacent channels, it may be easier to design subsequent components in the photonic integrated circuit (e.g., it may be easier to design demultiplexer 252-A and 252-B due to the increased wavelength spacing of the multi-channel optical signals 260-A and 260-B relative to the wavelength spacing of the optical signal 110).

FIG. 2C illustrates an example optical deinterleaver 217-C with three output regions (i.e., 204-A, 204-B, and 204-C), in accordance with an embodiment of the present disclosure. The optical deinterleaver 217-C is an alternative embodiment to the optical deinterleaver 217-A illustrated in FIG. 2A, which may be further coupled to an additional demultiplexer, and may be included in a photonic integrated circuit of the optical communication device 101-A illustrated in FIG. 1A. Referring back to FIG. 2C, the optical deinterleaver 217-C represents a generalized embodiment in which the optical signal 110 includes "n" (i.e., any natural number greater than or equal to six) channels. The dispersive region 230-C is subsequently structured to deinterleave the plurality of channels included in the optical signal 110 into one of the output regions (i.e., 204-A, 204-B, or 204-C). More specifically, individual channels included in every group of three adjacent channels (e.g., a first group including the first channel, the second channel and the third channel, a second group including a fourth channel, a fifth channel, and a sixth channel, and so on) are directed to a corresponding one of the output regions 204-A, 204-C, or 204-D to form the multi-channel optical signals 260-C, 260-D, and 260-E. In the same or other embodiments, the multi-channel optical signal 260-C includes each channel associated with $3m-2$, the multi-channel optical signal 260-D includes each channel associated with $3m-1$, and the multi-channel optical signal 260-E includes each channel associated with $3m$, where "m" includes every natural number less than or equal to n/3 when "n" is a natural number divisible by three with no remainder. In the same or other embodiments, a separation distance 232 between adjacent output regions included in the at least two output regions (e.g., distance between output region 204-A and 204-B and distance between 204-B and 204-C) is equal.

It is appreciated that in the embodiments described herein, the multi-channel optical signals formed by a given optical deinterleaver (e.g., the optical deinterleaver 217-A of FIG. 2A, the optical deinterleaver 217-B of FIG. 2B, the optical deinterleaver 217-C of FIG. 2C) include an equal number of channels. For example, the number of channels included in the multi-channel optical signal 260-A is equal to the number of channels included in the multi-channel optical signal 260-B for the optical deinterleaver 217-A illustrated in FIG. 1A. However, in other embodiments, the number of channels associated with respective output ports of a given optical deinterleaver is not necessarily equal. For example, in some embodiments, there may be more channels included in the multi-channel optical signal 260-A than the number of channels included in the multi-channel optical signal 260-B (e.g., then the total number of channels included in the optical signal 110 is not even). Additionally, it is appreciated that the at least two output regions (e.g., 204-A, 204-B, and/or 204-C illustrated in FIGS. 2A-2C) may include more than two output regions and is not limited to just two output regions. Rather, the dispersive regions (e.g., 230-A, 230-B, or 230-C) may be designed with an inverse design process (see, e.g., FIG. 6) based on a target number of output regions mapped to a target number of channels of the optical signal 110.

FIG. 2D illustrates an example photonic integrated circuit 290 including an intermediary deinterleaver 217-D and 217-E, in accordance with an embodiment of the present disclosure. The photonic integrated circuit 290 may be included in the optical communication device 101-A illustrated in FIG. 1A. Referring back to FIG. 2D, the photonic integrated circuit 290 implements a multi-stage demultiplexing process and includes the optical deinterleaver 217-B, a first intermediary deinterleaver 217-D, a second intermediary deinterleaver 217-E, and demultiplexers 219 (e.g., 219-C, 219-D, 219-E, 219-F). The first intermediary deinterleaver 217-D is optically coupled between the dispersive region 230-B of the optical deinterleaver 217-B and the first demultiplexer (e.g., 219-C). The intermediary deinterleaver 217-D is structured to separate the first multi-channel optical signal 260-A received from the dispersive region 230-B of the optical deinterleaver 217-B into two or more reduced multi-channel optical signals 272 (e.g., a first reduced multi-channel optical signal 272-A, including the first channel and the fifth channel, and a second reduced multi-channel optical signal 272-B, including the third channel and the seventh channel). It is appreciated that the number of channels included in each one of the reduced multi-channel optical signals 272 is less than a quantity of channels included in the first multi-channel optical signal 260-A and the second multi-channel optical signal 260-B. The second intermediary deinterleaver 217-E is optically coupled between the dispersive region 230-B of the optical deinterleaver 217-B and the second demultiplexer (e.g., 219-E). The first intermediary deinterleaver 217-D is further optically coupled between the dispersive region 230-B of the optical deinterleaver 217-B and the third demultiplexer (e.g., 219-D). The second intermediary deinterleaver 217-E is further optically coupled between the dispersive region 230-B of the optical deinterleaver 217-B and the fourth demultiplexer (e.g., 219-F). In some embodiments, the optical deinterleaver 217-B, the first intermediary deinterleaver 217-D, the second intermediary deinterleaver 217-E, the first demultiplexer 219-C, the second demultiplexer 219-E, the third demultiplexer 219-D, and the fourth demultiplexer 219-F form a monolithic structure included in or on a substrate material (e.g., silicon on insulator).

As illustrated, the multi-stage demultiplexing process includes providing the optical signal 110 to the optical deinterleaver 217-B via an input region optically coupled to the dispersive region 230-B. The multi-stage demultiplexing process further includes separating odd-numbered channels and even-numbered channels included in the optical signal 110 via the dispersive region 230-B and directing the odd-numbered channels and the even numbered channels to physically separated output regions of the optical deinterleaver 217-B to form a first multi-channel optical signal 260-A and a second multi-channel optical signal 260-B. The multi-stage demultiplexing process additionally includes providing the first multi-channel optical signal 260-A to the first intermediary deinterleaver 217-D (e.g., via a waveguide coupling one of the output regions of the optical deinterleaver 217-B to an input region of the first intermediary deinterleaver 217-D) and providing the second multi-channel optical signal 260-B to the second intermediary deinterleaver 217-E (e.g., via a waveguide coupling one of the output regions of the optical deinterleaver 217-B to an input region of the second intermediary deinterleaver 217-E). The multi-stage demultiplexing process includes separating the first multi-channel optical signal 260-A into two or more reduced multi-channel optical signals (e.g., 272-A and 272-B) via a dispersive region of the first intermediary optical deinterleaver 217-D such that the wavelength separation distance between adjacent channels included in any one of the two or more reduced multi-channel optical signals is greater than the wavelength separation distance between adjacent channels included in the first multi-channel optical signal 217-D. The multi-stage demultiplexing process further includes separating the second multi-channel optical signal 260-B into two or more reduced multi-channel optical signals (e.g., 272-C and 272-D) via a dispersive region of the second intermediary optical deinterleaver 217-E such that the wavelength separation distance between adjacent channels included in any one of the two or more reduced multi-channel optical signals is greater than the wavelength separation distance between adjacent channels included in the first multi-channel optical signal 217-D. The multi-stage demultiplexing process additionally includes providing the two or more reduced multi-channel optical signals 272 (e.g., 272-A, 272-B, 272-C, and 272-D) to a respective one of a plurality of demultiplexers 219 (e.g., 219-C, 219-D, 219-E, or 219-F). The multi-stage demultiplexing process includes demultiplexing the two or more reduced multi-channel optical signals 272 into individual channels via the dispersive region of a corresponding one of the plurality of demultiplexers 219 such that the individual channels (e.g., $\lambda_1$, $\lambda_2$, $\lambda_3$, $\lambda_4$, $\lambda_5$, $\lambda_6$, $\lambda_7$, or $\lambda_8$) may be read out (e.g., via an optical sensor coupled to output regions of the plurality of demultiplexers 219).

It is appreciated that in some embodiments the photonic integrated circuit 290 may include additional or fewer components (e.g., additional intermediary deinterleavers, additional demultiplexers, or the like) depending on the optical signal 110 and the functionality of the individual deinterleavers (e.g., number of output regions for each of the optical deinterleavers or intermediary deinterleaver). Further still, it is appreciated that the multi-stage demultiplexing process is not limited to one (e.g., as illustrated in FIG. 2A) or two (e.g., as illustrated in FIG. 2D) deinterleaving stages. Rather, additional deinterleaving stages may be included (e.g., secondary intermediary deinterleavers, tertiary intermediary deinterleavers, and so on) depending on a target functionality of the photonic integrated circuit 290.

Figure 2E:
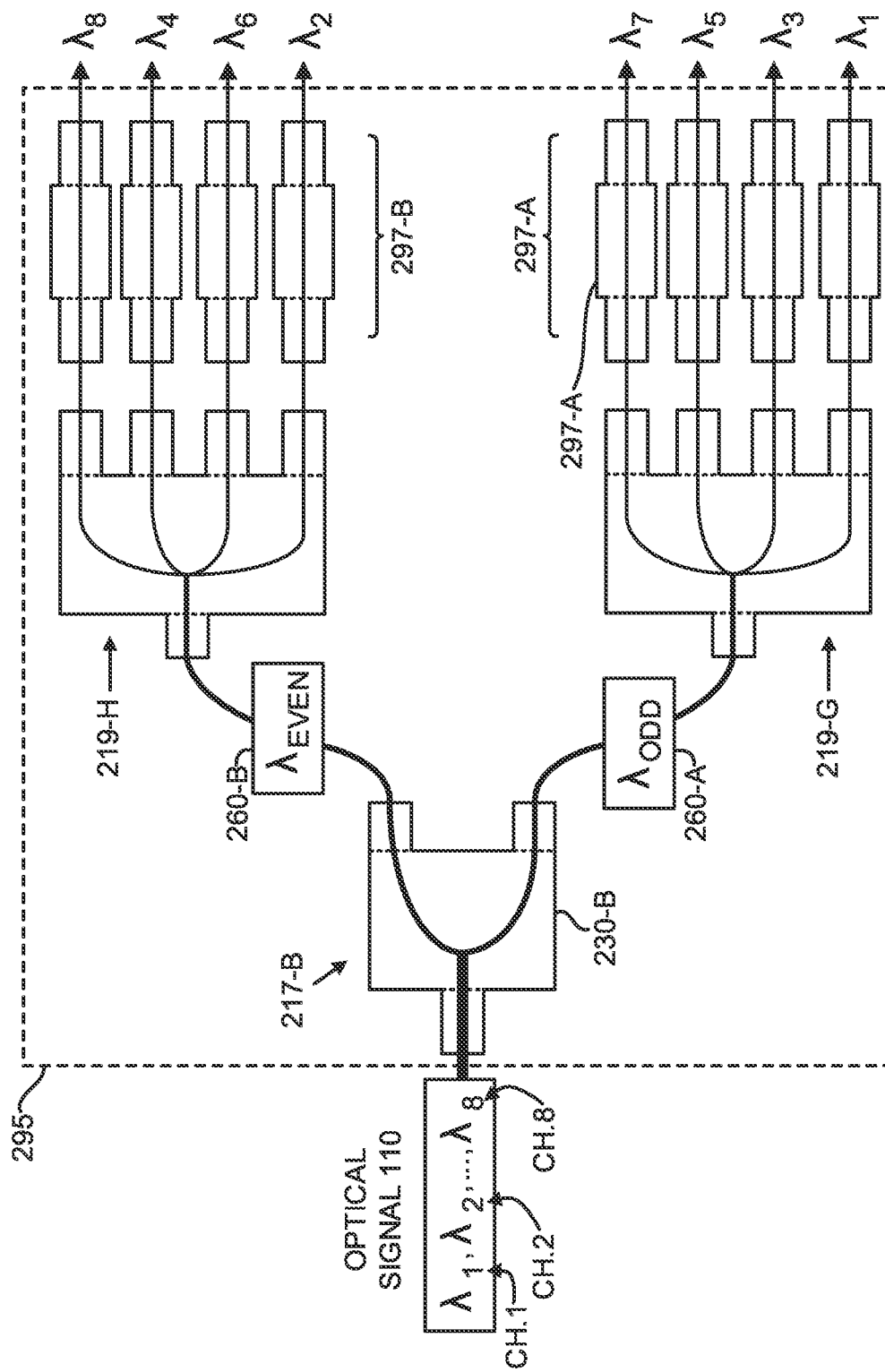
FIG. 2E illustrates an example photonic integrated circuit including an optical deinterleaver, a demultiplexer, and filter, in accordance with an embodiment of the present disclosure.

FIG. 2E illustrates an example photonic integrated circuit 295 including the optical deinterleaver 217-B, demultiplexers 219-G and 219-H, and a plurality of filters 297, in accordance with an embodiment of the present disclosure. The photonic integrated circuit 295 may be included in the optical communication device 101-A illustrated in FIGS. 1A and 1s similar to the photonic integrated circuit 250 illustrated in FIG. 2A in many regards. Referring back to FIG. 2E, one way the photonic integrated circuit 295 differs is that the demultiplexers 219-G and 219-H are each four-channel demultiplexers (e.g., such that intermediary deinterleavers may be omitted while still demultiplexing the optical signal 110 when the optical signal 110 includes eight individual channels). Another difference is the photonic integrated circuit 295 includes the plurality of filters 297 (e.g., a first group of filters 297-A that are individually coupled to a respective one of the output regions of the demultiplexer 219-G and a second group of filters 297-B that are individually coupled to a respective one of the output regions of the demultiplexer 219-H). In one embodiment, one of the plurality of filters 297 is coupled to the demultiplexer 219-G to receive the first channel (xi) demultiplexed from the first multi-channel optical signal 260-A and substantially attenuate light (e.g., reduce optical power or intensity by at least 50%, 60%, 70%, 80%, 90%, or more) light outside the first channel. As illustrated, the demultiplexer 219-G is optically coupled between the first group of filters 297-A and the dispersive region 230-B of the optical deinterleaver 217-B.

In some embodiments, each of the plurality of filters 297 provides additional isolation of a select channel included in the plurality of channels of the optical signal 110. In the same or other embodiments, the plurality of filters 297 are add/drop filters that attenuate light outside of a specific wavelength range corresponding to a specific channel. In some embodiments, each of the plurality of filters 297 has a corresponding dispersive region structured to provide the intended functionality of an add/drop filter. In other embodiments, the plurality of filters 297 may correspond to one or more optical ring resonators structured to resonate with a specific channel included in the optical signal 110. In such an embodiment, the optical ring resonator directs the light associated with a given channel to a specific output region while light outside of the given channel is directed to a different output region spatially separated from the specific output region. In some embodiments, the plurality of filters 297 may be included in any other photonic integrated circuit described herein (e.g., output regions of the demultiplexers 219 of FIG. 2A or FIG. 2D may be optically coupled to the plurality of filters 297).

FIGS. 3A-3D illustrate example views of a dispersive region 330 included in an optical deinterleaver 317, in accordance with an embodiment of the present disclosure. The optical deinterleaver 317 is one possible implementation of the optical deinterleaver 117 illustrated in FIG. 1A or the optical deinterleaver 217 (e.g., any of 217-A, 217-B, 217-C, 217-D, or 217-E) illustrated in FIGS. 2A-2E. It is further appreciated that while discussion henceforth may be directed towards an optical deinterleaver, a similar structure may be utilized for demultiplexers, filters, or the like, in accordance with embodiments of the present disclosure. In other words, the cross-sections illustrated in FIGS. 3A-3D may be similarly applicable to the embodiments of demultiplexers and filters discussed throughout this disclosure.

FIG. 3A illustrates a cross-sectional view of the optical deinterleaver 317 along a lateral plane within an active layer defined by a width 321 and a length 323 of the optical deinterleaver 317. As illustrated, optical deinterleaver 317 includes an input region 302 (e.g., comparable to input region 202 illustrated in FIG. 2A), a plurality of output regions 304 (e.g., comparable to the at least two output regions 204 illustrated in FIG. 2A), and a dispersive region 330 optically disposed between the input region 302 and the plurality of output regions 304. The input region 302 and the plurality of output regions 304 (e.g., 304-A and 304-B) are each optically coupled to the dispersive region 330 and may correspond to waveguides (e.g., slab waveguide, strip waveguide, slot waveguide, or the like) capable of propagating light along the path of the waveguide. The dispersive region 330 includes an inhomogeneous arrangement of a first material 332 (e.g., silicon) and a second material 334 (e.g., silicon dioxide) to form a plurality of interfaces that each correspond to a change in refractive index of the dispersive region 330 and collectively structure the dispersive region 330 to separate an input signal (e.g., the optical signal 110 illustrated in FIGS. 1A-2E) into a plurality of multi-channel optical signals (e.g., the first multi-channel optical signal 260-A and the second multi-channel optical signal 260-B illustrated in FIGS. 2A-2E) and respectively guide each of the multi-channel optical signals to a corresponding one of the plurality of output regions 304 when the input region 302 receives the input signal.

As illustrated in FIG. 3A, the dispersive region 330 of the optical deinterleaver 317 has a fixed area (e.g., defined by the width 325 and the length 327) that is laterally surrounded by a peripheral region 322 formed by the second material 334. It is appreciated that in some embodiments the second material 334, included in the peripheral region 322 of the optical deinterleaver 317, proximate to the dispersive region 330 extends continuously around the dispersive region 330 except for the input region 302 and the plurality of output regions 304 (e.g., the at least two output regions 304-A and 304-B). In some embodiments, the periphery region 322 has a homogeneous composition of the second material. In the illustrated embodiment, dispersive region 330 includes a first side 331 and a second side 333 that each interface with an inner boundary (i.e., the unlabeled dashed line of periphery region 322 disposed between dispersive region 330 and dashed-dotted line corresponding to an outer boundary of periphery region 322). The first side 331 and the second side 333 correspond to opposite sides of the dispersive region 330. The input region 302 is disposed proximate to the first side 331 (e.g., one side of the input region 302 abuts the first side 331 of the dispersive region 330) while each of the plurality of output regions 304 are disposed proximate to the second side 333 (e.g., one side of each of the plurality of output regions 304 abuts the second side 333 of the dispersive region 330).

In the illustrated embodiment each of the plurality of output regions 304 are parallel to each other one of the plurality of output regions 304. However, in other embodiments the plurality of output regions 304 may not be parallel to one another or even disposed on the same side (e.g., one or more of the plurality of output regions 304 and/or input region 302 may be disposed proximate to sides of dispersive region 330 that are adjacent to first side 331 and/or second side 333). In one embodiment, first output region 304-A is separated from second output region 304-B by a separation distance 306 corresponding to less than 50 µm, less than 30 µm, less than 10 µm, less than 5 µm, less than 2 µm, approximately 1.1 µm, or otherwise.

It is noted that the first material and second material of dispersive region 330 are arranged and shaped within the dispersive region 330 such that the material interface pattern is substantially proportional to a design obtainable with an inverse design process (see, e.g., FIG. 6), which will be discussed in greater detail later in the present disclosure. More specifically, in some embodiments, the inverse design process may include iterative optimization (e.g., gradient based or otherwise) of a design based at least in part on a loss function that incorporates a performance loss (e.g., to enforce functionality) and a fabrication loss (e.g., to enforce fabricability and binarization of a first material and a second material) that is collectively reduced or otherwise adjusted iteratively until a design within target specifications that is also manufacturable is obtained. In the same or other embodiments, other optimization techniques may be used instead of, or jointly with, gradient-based optimization. Advantageously, this allows for optimization of a near unlimited number of design parameters to achieve functionality and performance within a predetermined area that may not have been possible with conventional design techniques.

In one embodiment dispersive region 330 is an optical cavity with a fixed area of less than 100 µm×100 µm, less than 35 µm×35 µm, or otherwise. In the same or other embodiments, the fixed area of the dispersive region 330 is greater than 3 µm×3 µm. In some embodiments, the width 325 of the dispersive region 330 may be less than 100 µm, less than 50 µm, less than 35 µm, less than 20 µm, less than 10 µm, less than 5 µm, approximately 3.2 µm, or otherwise. In the same or other embodiments, the length 327 of dispersive region 330 may be less than 100 µm, less than 50 µm, less than 35 µm, less than 10 µm, approximately 6.4 µm, or otherwise. As illustrated, the dispersive region 330 has a square area with the width 325 substantially equal (e.g., with at least 1%, 5%, or 10%) to the length 327. However, in other embodiments, the dispersive region 330 may have different lengths and widths (e.g., rectangular, octagonal, circular, ovoidal, or otherwise). For example, in one embodiment, the width 325 and the length 327 of the dispersive region 330 may respectively be 3.2 µm and 6.4 µm. In some embodiments, the input region 302 and each of the plurality of output regions 304 may have a common width (e.g., parallel to the direction of the width 325) that may correspond to less than 1 µm, less than 0.5 µm, approximately 0.4 µm, or otherwise.

FIG. 3B illustrates a vertical schematic or stack of various layers that are included in the illustrated embodiment of the optical deinterleaver 317 illustrated in FIG. 3A. However, it is appreciated that the illustrated embodiment is not exhaustive and that certain features or elements may be omitted to avoid obscuring certain aspects of the invention. In the illustrated embodiment, the optical deinterleaver 317 includes substrate 302, dielectric layer 304, active layer 306 (e.g., as shown in the cross-sectional illustration of FIG. 3A), and a cladding layer 308. In some embodiments, optical deinterleaver 317 may be, in part or otherwise, a photonic integrated circuit or silicon photonic device that is compatible with conventional fabrication techniques (e.g., photolithography, electron-beam lithography, sputtering, thermal evaporation, physical and chemical vapor deposition, and the like).

In one embodiment a silicon on insulator (SOI) wafer may be provided that includes sequentially stacked layers including a support substrate (e.g., a silicon substrate), a silicon dioxide layer, and a silicon layer (e.g., doped silicon, undoped silicon, or otherwise). The support substrate of the SOI wafer may correspond to substrate 302. The silicon dioxide layer of the SOI wafer may correspond to dielectric layer 304. The silicon layer of the SOI wafer may be selectively etched by lithographically creating a pattern on the SOI wafer (e.g., directly on top of the silicon layer) that is transferred to the SOI wafer via a dry etch process (e.g., via a photoresist mask or any other mask) to remove portions of the silicon layer. The etched portions of the silicon layer included in the SOI wafer may subsequently be backfilled with silicon dioxide and planarized to form a patterned layer of silicon and silicon dioxide, which may collectively correspond to the active layer 306. An oxide layer (e.g., silicon dioxide or otherwise) may be grown, deposited, or otherwise provided on top of the etched/backfilled silicon layer of the SOI wafer, which may correspond to the cladding layer 308. It is appreciated that during the etch process, the silicon within the active layer 306 may be selectively etched all the way down to dielectric layer 304 to form voids that may subsequently be backfilled with silicon dioxide, planarized, and then further encapsulated with silicon dioxide to form the cladding layer 308. In one embodiment, formation of the active layer 306 may include several etch depths including a full etch depth of the silicon to obtain the targeted structure. In one embodiment, the silicon may be 220 nm thick and thus the full etch depth may be at least 220 nm. In some embodiments, forming the optical deinterleaver 317 may include a two-step encapsulation process in which two silicon dioxide depositions are performed with an intermediate chemical mechanical planarization used to yield a planar surface of the active layer 306.

FIG. 3C illustrates a more detailed view of the active layer 306 (relative to FIG. 3B) taken along a portion of the periphery region 322 that includes the input region 302 of FIG. 3A. In the illustrated embodiment, the active region 306 includes the first material 332 with a refractive index of $\varepsilon_1$ and the second material 334 with a refractive index of E2 that is different from $\varepsilon_1$. Homogenous regions of the first material 332 and the second material 334 may form waveguides or portions of waveguides that correspond to the input region 302 and the plurality of output regions 304 as illustrated in FIGS. 3A and 3C.

FIG. 3D illustrates a more detailed view of the active layer 306 (relative to FIG. 3B) taken along the dispersive region 330. As described previously, the dispersive region 306 includes the first material 332 (e.g., silicon) and the second material 334 (e.g., silicon dioxide) that are inhomogeneously interspersed to form a plurality of interfaces 336 that collectively form a material interface pattern to provide the target functionality of the optical deinterleaver 317.

Figure 4A:
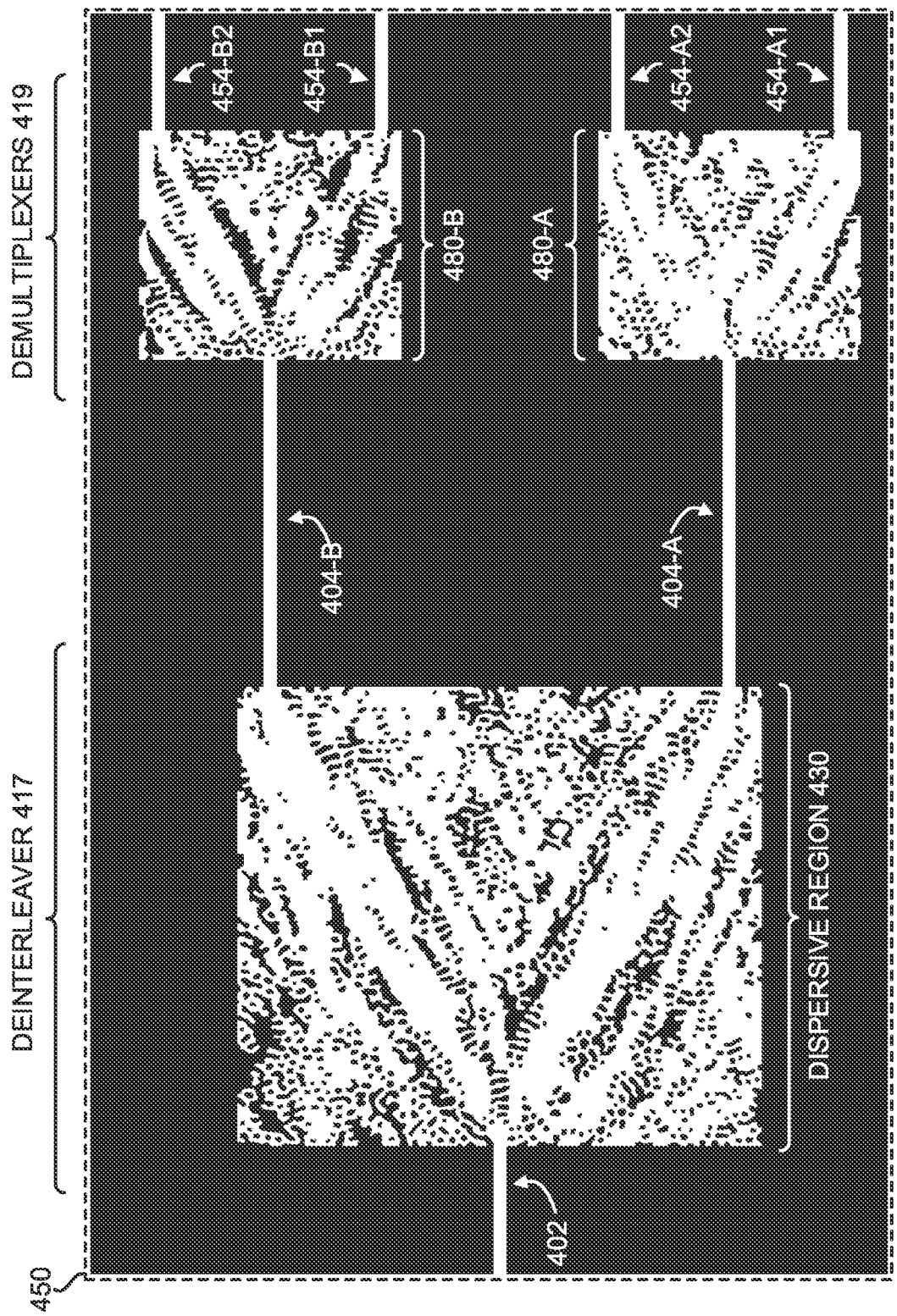
FIG. 4A illustrates an example schematic of a photonic integrated circuit including an optical deinterleaver, in accordance with an embodiment of the present disclosure.

FIG. 4A illustrates an example schematic of a photonic integrated circuit 450 including an optical deinterleaver 417 and demultiplexers 419, in accordance with an embodiment of the present disclosure. The photonic integrated circuit 450 is one possible implementation of the photonic integrated circuit 250 illustrated in FIG. 2A and may be included in the optical communication device 101-A illustrated in FIG. 1A. More specifically, the view illustrated by FIG. 4A corresponds to a cross-sectional view within an active layer (e.g., the active layer 306 illustrated in FIG. 3B) included in the photonic integrated circuit 450. As illustrated, the photonic integrated circuit 450 includes a first material (e.g., represented by white colored regions, which may correspond to silicon) and a second material (e.g., represented by black colored regions, which may correspond to silicon dioxide). The optical deinterleaver 417 includes dispersive region 430, which represents one possible design of the dispersive region 230-A illustrated in FIG. 2A or the dispersive region 230-B illustrated in FIG. 2B. Similarly, demultiplexers 419 include dispersive regions 480-A and 480-B, which represent possible designs of the dispersive regions 280-A and 280-B illustrated in FIG. 2A. As illustrated, the dispersive region 430 of the optical deinterleaver 417 is optically coupled between an input region 402 and at least two output regions 404-A and 404-B. The dispersive region 480 (e.g., 480-A or 480-B) is optically coupled between one of the at least two output regions (e.g., 404-A or 404-B) and the output regions 454 (e.g., 454-A1 and 454-A2 or 454-B1 and 454-B2) of a corresponding one of the demultiplexers 419. It is appreciated that in some embodiments, the input region of a given one of the demultiplexers 419 corresponds to one of the at least two output regions 404 (e.g., 404-A or 404-B).

The structure within the dispersive region 430 (and dispersive region 480-A and 480-B) are designs obtained from an inverse design process that may utilize iterative optimization (e.g., gradient-based optimization, Markov Chain Monte Carlo optimization, or other optimization techniques) combined with first principles simulations of the underlying physics governing the photonic device to generate a design that is substantially replicated by dispersive region 430 within a proportional or scaled manner such that photonic integrated circuit 450 provides the targeted functionality (e.g., a multi-stage demultiplexing process within a monolithic photonic integrated circuit). The inverse design process may include a fabrication loss that enforces a minimum feature size, for example, to ensure fabricability of the design. In the embodiments of dispersive region 430 illustrated in FIGS. 4A-4C, the material interface pattern formed by the first material (e.g., white colored regions) and the second material (e.g., black colored regions) is shaped to enforce the minimum feature size with a specified shape. In one embodiment, interfaces formed by the first material and the second material may be shaped such that a curvature defining any given radius of curvature formed by a material interface within the dispersive region 430 has a magnitude of less than a threshold size. For example, if the minimum feature size is 150 nm, the curvature for any of the plurality of interfaces have a magnitude of less than the threshold size, which corresponds to the inverse of half the minimum feature size (i.e., $\frac{1}{75}$ nm$^{-1}$). In other embodiments, the minimum feature size may include a minimum feature shape (e.g., a square, circle, hexagon, octagon, or any other shape) having a width corresponding to the minimum feature size (e.g., 100 nm, 140 nm, 150 nm, 180 nm, or otherwise). Thus, any portion of the first material and the second material may be structured within the dispersive region 430 such that the minimum feature shape (e.g., an octagon) with a width of the minimum feature size may be used to form (e.g., draw, paint, or otherwise construct a design representative of the structure) the dispersive region 430. Enforcement of such a minimum feature size and/or shape prevents the inverse design process from generating designs that are not fabricable by considering manufacturing constraints, limitations, and/or yield. In the same or other embodiments, different or additional checks on metrics related to fabricability may be utilized to enforce a minimum width or spacing as a minimum feature size. It is further appreciated that similar constraints may be placed on the dispersive regions 480-A and 480-B for the demultiplexers 419, in accordance with embodiments of the disclosure.

Figure 4B:
FIGS. 4B-4C illustrate more detailed views of a dispersive region included in the optical deinterleaver illustrated in FIG. 4A, in accordance with an embodiment of the present disclosure.
Figure 4C:
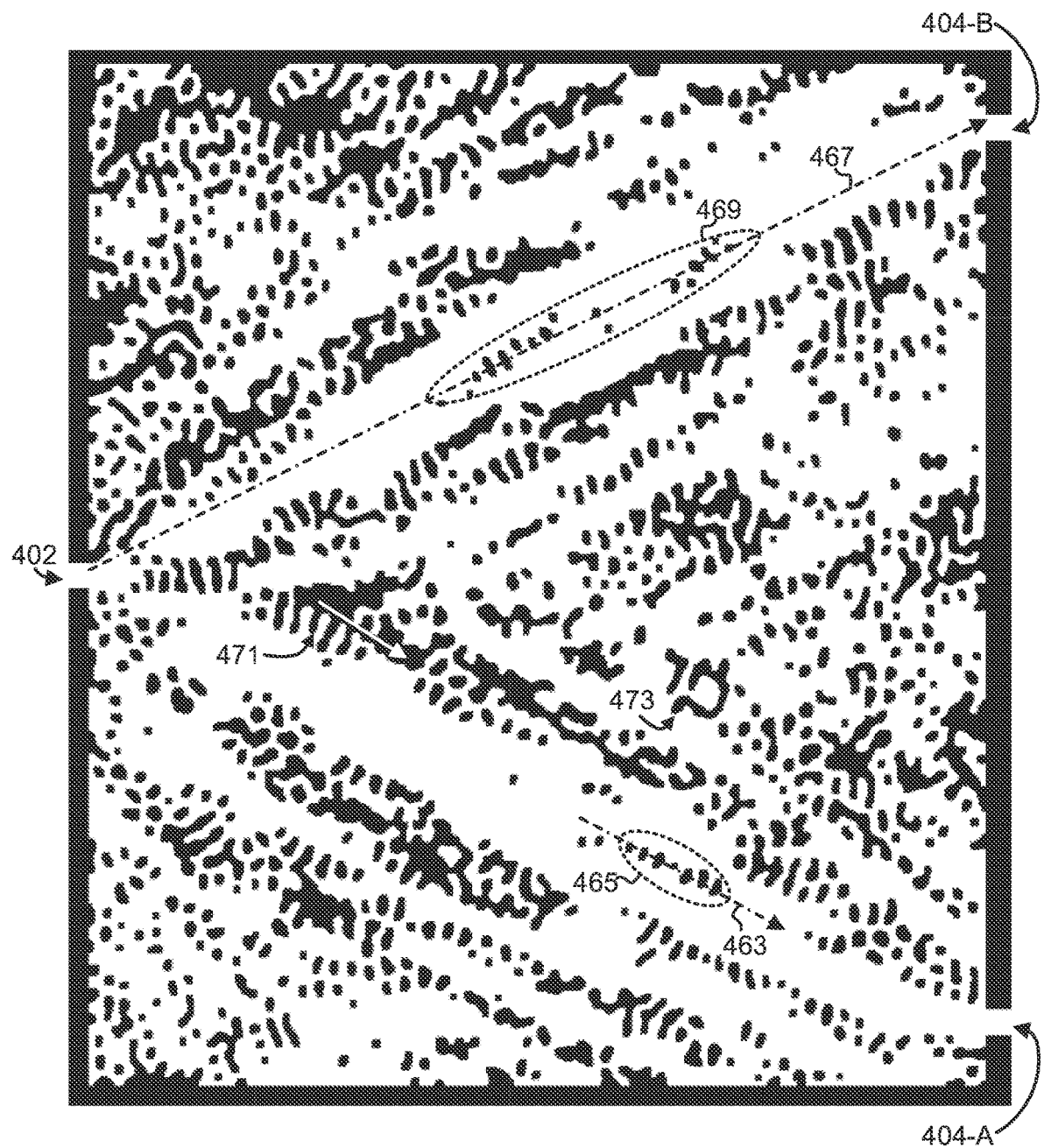

FIGS. 4B-4C illustrate more detailed views of the dispersive region 430 included in the optical deinterleaver 417 illustrated in FIG. 4A, in accordance with an embodiment of the present disclosure. More specifically, select features of the dispersive region 430 are explicitly pointed out and discussed in FIGS. 4B-4C. However, it is appreciated that the same or similar features discussed may also be included in the dispersive region of any optical deinterleaver (e.g., deinterleaver 117 illustrated in FIG. 1A, deinterleaver 217-A illustrated in FIG. 2A, deinterleaver 217-B illustrated in FIGS. 2B, 2D, and 2D and FIG. 2E, deinterleaver 217-C illustrated in FIG. 2C, deinterleaver 317 illustrated in FIG. 3A) and any demultiplexer (e.g., demultiplexer 119 illustrated in FIG. 1A, demultiplexers 219-A and 219-B illustrated in FIG. 2A, demultiplexers 219-C, 219-D, 219-E, and 219-F illustrated in FIG. 2D, and demultiplexers 219-G and 219-H illustrated in FIG. 2E) or filters (e.g., filter 297 illustrated in FIG. 2E), in accordance with embodiments of the present disclosure.

Referring back to FIG. 4B, the dispersive region 430 includes an inhomogeneous arrangement of the first material (e.g., white colored regions) and the second material (e.g., black colored regions). The term "inhomogeneous" means the arrangement of the first material and the second material is not homogeneous. In other words, the shape and arrangement of the first and the second material is non-periodic. However, it is noted that while the dispersive region 430 generally has a non-periodic structure, there may be one or more regions with local periodicity (e.g., islands of the first material or the second material that are regularly spaced apart but do not have equal size and/or shape). As illustrated in FIG. 4B, the inhomogeneous arrangement of the first material and the second material within the dispersive region includes at least one of a plurality of first islands 451 (e.g., where each island included in the plurality of first islands 451 is formed of the first material), a plurality of second islands 453 (e.g., where each island included in the plurality of second islands 453 is formed of the second material), a first continuous path 459 formed of the first material that extends from the input region 402, through the dispersive region 430, and to the first output region 404-A, a second continuous path 461 formed of the first material that extends from the input region 402, through the dispersive region 430, and to the second output region 404-B, a plurality of protrusions 455 or 457 (e.g., each formed or the first material or the second material and extending from the peripheral region into the dispersive region 430), or at least one dendritic structure (see, e.g., dendritic structure 471 illustrated in FIG. 4C with an alternating width along the direction indicated by the white arrow). In some embodiments the first continuous path 459 and the second continuous path 461 overlap within the input region 402 and/or the dispersive region 430.

FIG. 4C illustrates the same view of the dispersive region 430 with different features highlighted to avoid obscuring certain aspects of the disclosure. As illustrated, a first group of islands 465 included in the plurality of second islands are arranged along a common direction 463 within the dispersive region 430. Similarly, a second group of islands 469 included in the plurality of second islands are arranged along a common direction 467 within the dispersive region 430. As illustrated, the common direction 463 extends towards the first output region 404-A and the common direction 467 extends towards the second output region 404-B. In the illustrated embodiment, the common direction 463 extends from the input region 402 to the first output region 404-A and the common direction 467 extends from the input region 402 to the second output region 404-B. The dispersive region 430 further includes at least one dendritic structure 471 with an alternating width along a first direction (e.g., white arrow proximate to the at least one dendritic structure 471). In some embodiments, the first direction may extend towards the first output region 404-A or the second output region 404-B.

It is appreciated that in some embodiments, the inhomogeneous arrangement of the first material and the second material within the dispersive region 430 lacks global periodicity. However, in some embodiments, the dispersive region 430 may have local periodicity (e.g., where a group of islands included in the plurality of first islands or the plurality of second islands are arranged to be regularly spaced apart, but do not necessarily have a common shape, size, or orientation). In the same or other embodiments, each one of the one or more regions that formed the local periodicity correspond to less than 10% of a cross-sectional area of the dispersive region 430. For example, in one embodiment, the first group of islands 465 may correspond to a region of local periodicity included in the dispersive region 430.

Referring back to FIG. 4A, it is appreciated that in some embodiments, the design of the photonic integrated circuit 450, individual components of the photonic integrated circuit 450 such as the optical deinterleaver 417, the demultiplexers 419, any other photonic integrated circuit described herein, and/or their corresponding components may be stored in at least one non-transitory machine-accessible storage medium that provides instructions that, when executed by a machine (e.g., a computer), will cause the machine to perform operations for schematically reproducing the design for the photonic integrated circuit.

Figure 5:
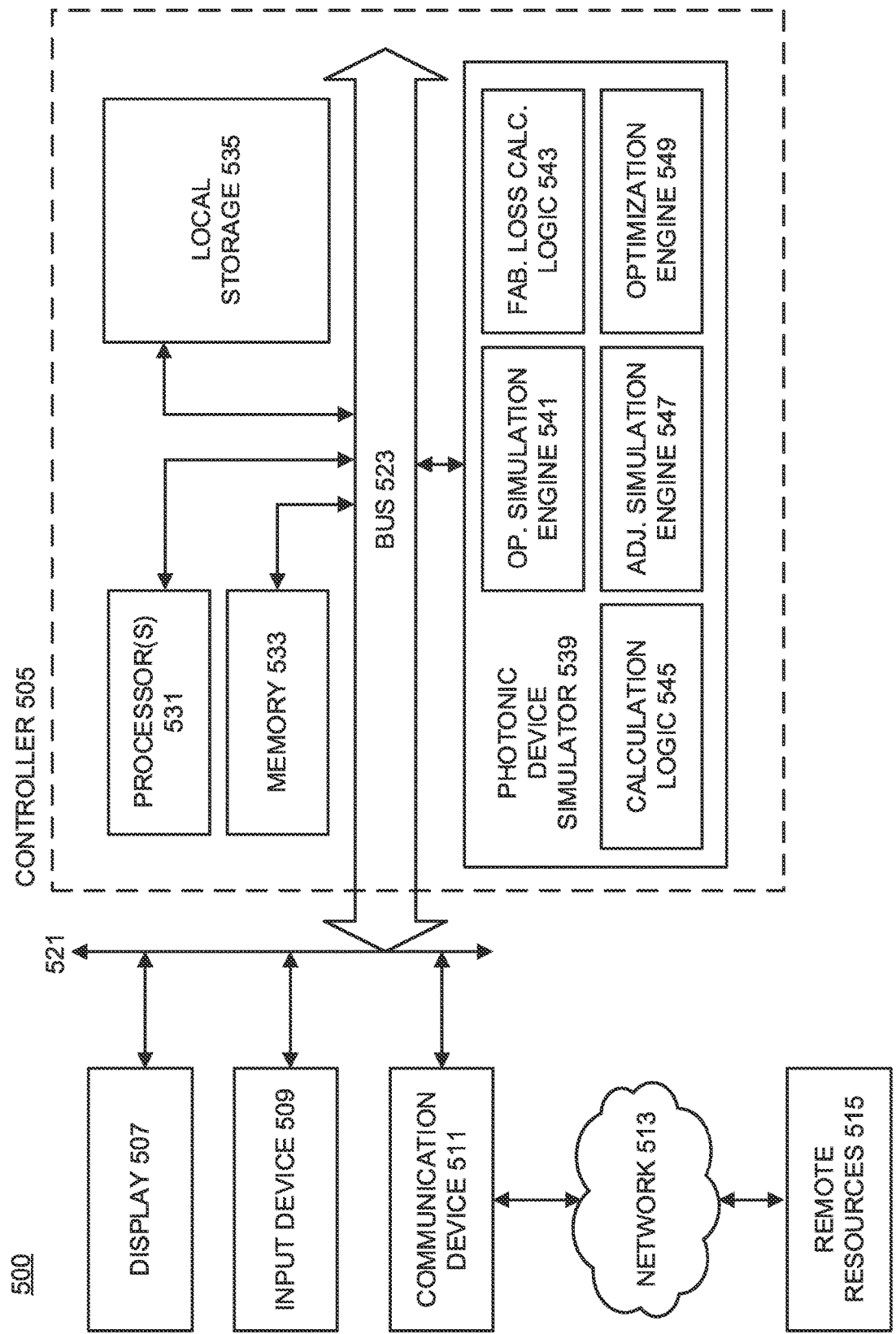
FIG. 5 is a functional block diagram illustrating a system for generating a design of a photonic integrated circuit, in accordance with an embodiment of the present disclosure.

FIG. 5 is a functional block diagram illustrating a system 500 for generating a design of a photonic integrated circuit, in accordance with an embodiment of the present disclosure. The system 500 may be utilized to perform the inverse design process. More specifically, the system 500 is a design tool that may be utilized to optimize structural parameters (e.g., shape and arrangement of a first material and a second material within the dispersive region of the embodiments described in the present disclosure) of photonic integrated circuits (e.g., optical deinterleavers, demultiplexers, filters, or otherwise) based on first-principles simulations (e.g., electromagnetic simulations to determine a field response of the photonic device to an excitation source) and iterative optimization. In other words, system 500 may provide a design obtained via the inverse design process that reproduces (i.e., proportionally scales) the dispersive regions described in various embodiments of the disclosure.

As illustrated, system 500 includes controller 505, display 507, input device(s) 509, communication device(s) 511, network 513, remote resources 515, bus 521, and bus 523. Controller 505 includes processor 531, memory 533, local storage 535, and photonic device simulator 539. Photonic device simulator 539 includes operational simulation engine 541, fabrication loss calculation logic 543, calculation logic 545, adjoint simulation engine 547, and optimization engine 549. It is appreciated that in some embodiments, controller 505 may be a distributed system.

Controller 505 is coupled to display 507 (e.g., a light emitting diode display, a liquid crystal display, and the like) coupled to bus 521 through bus 523 for displaying information to a user utilizing system 500 to optimize structural parameters of the photonic device (i.e., demultiplexer). Input device 509 is coupled to bus 521 through bus 523 for communicating information and command selections to processor 531. Input device 509 may include a mouse, trackball, keyboard, stylus, or other computer peripheral, to facilitate an interaction between the user and controller 505. In response, controller 505 may provide verification of the interaction through display 507.

Another device, which may optionally be coupled to controller 505, is a communication device 511 for accessing remote resources 515 of a distributed system via network 513. Communication device 511 may include any of a number of networking peripheral devices such as those used for coupling to an Ethernet, Internet, or wide area network, and the like. Communication device 511 may further include a mechanism that provides connectivity between controller 505 and the outside world. Note that any or all of the components of system 500 illustrated in FIG. 5 and associated hardware may be used in various embodiments of the present disclosure. The remote resources 515 may be part of a distributed system and include any number of processors, memory, and other resources for optimizing the structural parameters of the photonic device.

Controller 505 orchestrates operation of system 500 for optimizing structural parameters of the photonic device. Processor 531 (e.g., one or more central processing units, graphics processing units, and/or tensor processing units, etc.), memory 533 (e.g., volatile memory such as DRAM and SRAM, non-volatile memory such as ROM, flash memory, and the like), local storage 535 (e.g., magnetic memory such as computer disk drives), and the photonic device simulator 539 are coupled to each other through bus 523. Controller 505 includes software (e.g., instructions included in memory 533 coupled to processor 531) and/or hardware logic (e.g., application specific integrated circuits, field-programmable gate arrays, and the like) that when executed by controller 505 causes controller 505 or system 500 to perform operations. The operations may be based on instructions stored within any one of, or a combination of, memory 533, local storage 535, physical device simulator 539, and remote resources 515 accessed through network 513.

In the illustrated embodiment, modules 541-549 of photonic device simulator 539 are utilized to optimize structural parameters of components of the photonic integrated circuits described in embodiments here. In some embodiments, the system 500 may optimize the structural parameters of the components included in the photonic integrated circuit (e.g., a photonic device corresponding to one or more optical deinterleavers, demultiplexers, filters, or otherwise) via, inter alia, simulations (e.g., operational and adjoint simulations) that utilize a finite-difference time-domain (FDTD) method to model the field response (e.g., electric and magnetic fields within the photonic integrated circuit). The operational simulation engine 541 provides instructions for performing an electromagnetic simulation of the photonic device operating in response to an excitation source within a simulated environment. In particular, the operational simulation determines a field response of the simulated environment (and thus the photonic device, which is described by the simulated environment) in response to the excitation source for determining a performance metric of the physical device (e.g., based off an initial description or input design of the photonic device that describes the structural parameters of the photonic device within the simulated environment with a plurality of voxels). The structural parameters may correspond, for example, to the specific design, material compositions, dimensions, and the like of the physical device. Fabrication loss calculation logic 543 provides instructions for determining a fabrication loss, which is utilized to enforce a minimum feature size and/or shape to ensure fabricability. In some embodiments, the fabrication loss is also used to enforce binarization of the design (i.e., such that the photonic device includes a first material and a second material that are interspersed to form a plurality of interfaces). Calculation logic 545 computes a loss metric determined via a loss function that incorporates a performance loss, based on the performance metric, and the fabrication loss. Adjoint simulation engine 547 is utilized in conjunction with the operational simulation engine 541 to perform an adjoint simulation of the photonic device to backpropagate the loss metric through the simulated environment via the loss function to determine how changes in the structural parameters of the photonic device influence the loss metric. Optimization engine 549 is utilized to update the structural parameters of the photonic device to reduce the loss metric and generate a revised description (i.e., revising the design) of the photonic device.

Figure 6:
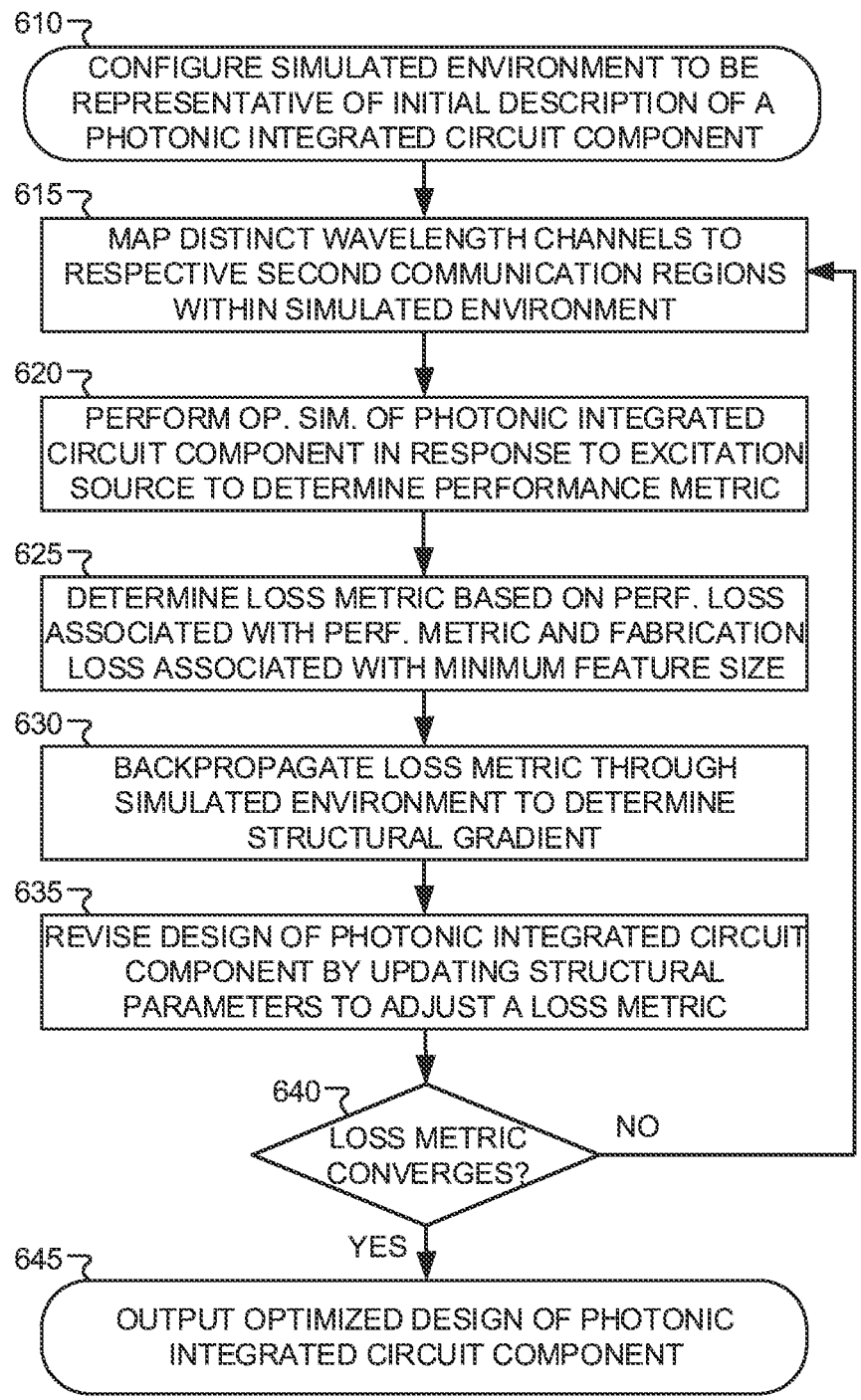
FIG. 6 shows an example method for generating a design of a photonic integrated circuit, in accordance with an embodiment of the present disclosure.

FIG. 6 shows an example method 600 for generating a design of a photonic integrated circuit, in accordance with an embodiment of the present disclosure. The method 600 is one possible inverse design process for generating any one of components of the photonic integrated circuits described herein (e.g., optical deinterleavers, demultiplexers, filters, or otherwise). It is appreciated that the method 600 is an inverse design process that may be accomplished by performing operations with a system (e.g., system 500 of FIG. 5) to perform iterative optimization of a loss metric determined from a loss function that includes a performance loss and a fabrication loss. In the same or other embodiments, the method 600 may be included as instructions provided by at least one machine-accessible storage medium (e.g., non-transitory memory) that, when executed by a machine, will cause the machine to perform operations for generating the design of the photonic integrated circuit component. It is further appreciated that the order in which some or all of the process blocks appear in the method 600 should not be deemed limiting. Rather, one of ordinary skill in the art having the benefit of the present disclosure will understand that some of the process blocks may be executed in a variety of orders not illustrated, or even in parallel.

Block 610 illustrates configuring a simulated environment to be representative of an initial description of a photonic integrated circuit component (e.g., a photonic device) that has been received or otherwise obtained. In some embodiments, the photonic integrated circuit component may be expected to have a certain functionality (e.g., perform as an optical deinterleaver) after optimization. The initial description may describe structural parameters of the photonic integrated circuit within a simulated environment. The simulated environment may include a plurality of voxels that collectively describe the structural parameters of the photonic device. Each of the plurality of voxels is associated with a structural value to describe the structural parameters, a field value to describe the field response (e.g., the electric and magnetic fields in one or more orthogonal directions) to physical stimuli (e.g., one or more excitation sources), and a source value to describe the physical stimuli. Once the initial description has been received or otherwise obtained, the simulated environment is configured (e.g., the number of voxels, shape/arrangement of voxels, and specific values for the structural value, field value, and/or source value of the voxels are set based on the initial description). In some embodiments the initial description may be a first description of the physical device in which values for the structural parameters may be random values or null values outside of input and output regions such that there is no bias for the initial (e.g., first) design. It is appreciated that the initial description or input design may be a relative term. Thus, in some embodiments an initial description may be a first description of the physical device described within the context of the simulated environment (e.g., a first input design for performing a first operational simulation).

However, in other embodiments, the term initial description may refer to an initial description of a particular cycle (e.g., of performing an operational simulation, operating an adjoint simulation, and updating the structural parameters). In such an embodiment, the initial description or design of that particular cycle may correspond to a revised description or refined design (e.g., generated from a previous cycle). In one embodiment, the simulated environment includes a design region (e.g., representative of the dispersive region discussed throughout this disclosure) that includes a portion of the plurality of voxels which have structural parameters that may be updated, revised, or otherwise changed to optimize the structural parameters of the photonic device. In the same or other embodiments, the structural parameters are associated with geometric boundaries and/or material compositions of the physical device based on the material properties (e.g., relative permittivity, index of refraction, etc.) of the simulated environment.

In one embodiment the simulated environment includes a design region optically coupled between a first communication region and a plurality of second communication regions. In some embodiments, the first communication region may correspond to an input region or port (e.g., where an excitation source originates), while the second communication regions may correspond to a plurality of output regions or ports (e.g., when designing an optical deinterleaver that optically separates an input signal received at the input port to a plurality of multi-channel optical signals that are respectively guided to a corresponding one of the output regions).

Block 615 shows mapping each of a plurality of channels characterized by a distinct wavelength to a respective one of the plurality of second communication regions to form the plurality of multi-channel optical signals. The distinct wavelength channels may be mapped to the second communication regions by virtue of the initial description of the photonic device. For example, a loss function may be chosen that associates a performance metric of the photonic device with power transmission from the input port to individual output ports for mapped channels. In one embodiment, the plurality of second communication regions includes two second communication regions and the plurality of channels included in the optical signal includes at least four channels with groups of two channels each mapped to a corresponding one of the two communication regions. In the same or other embodiments, the channels may be mapped in order of wavelength such that optimization of the design region enforces separating odd-numbered and even-numbers channels to different output regions. In other embodiments, there may be a different number of the second communication regions (e.g., three regions, four regions, or otherwise) and a different number of channels (e.g., eight channels, twelve channels, or otherwise) that are mapped to a respective one of the second communication regions.

Block 620 illustrates performing an operational simulation of the photonic integrated circuit within the simulated environment operating in response to one or more excitation sources to determine a performance metric. More specifically, an electromagnetic simulation is performed in which a field response of the photonic integrated circuit is updated incrementally over a plurality of time steps to determine how the field response of the photonic device changes due to the excitation source. The field values of the plurality of voxels are updated in response to the excitation source and based, at least in part, on the structural parameters of the integrated photonic circuit. Additionally, each update operation at a particular time step may also be based, at least in part, on a previous (e.g., immediately prior) time step.

Consequently, the operational simulation simulates an interaction between the photonic device (i.e., the photonic integrated circuit) and a physical stimuli (i.e., one or more excitation sources) to determine a simulated output of the photonic device (e.g., at one or more of the output ports or regions) in response to the physical stimuli. The interaction may correspond to any one of, or combination of a perturbation, retransmission, attenuation, dispersion, refraction, reflection, diffraction, absorption, scattering, amplification, or otherwise of the physical stimuli within electromagnetic domain due, at least in part, to the structural parameters of the photonic device and underlying physics governing operation of the photonic device. Thus, the operational simulation simulates how the field response of the simulated environment changes due to the excitation source over a plurality of time steps (e.g., from an initial to final time step with a pre-determined step size).

In some embodiments, the simulated output may be utilized to determine one or more performance metrics of the photonic integrated circuit. For example, the excitation source may correspond to a selected one of a plurality of channels that are mapped to one of the plurality of second communication regions. The excitation source may originate at or be disposed proximate to the first communication region (i.e., input port) when performing the operational simulation. During the operational simulation, the field response at the second communication region (e.g., output port) mapped to the selected one of the plurality of channels may then be utilized to determine a simulated power transmission of the photonic integrated circuit for the selected channel. In other words, the operational simulation may be utilized to determine the performance metric that includes determining a simulated power transmission of the excitation source from the first communication region, through the design region, and to a respective one of the plurality of second communication regions mapped to the selected one of the plurality of channels. In some embodiments, the excitation source may cover the spectrum of all of the plurality of output ports (e.g., the excitation source spans at least the targeted frequency ranges for the passband regions for each of the plurality channels and at least portions of the corresponding stopband regions) to determine a performance metric (i.e., simulated power transmission) associated with each of the distinct wavelength channels for the photonic integrated circuit. In some embodiments, one or more frequencies that span the passband of a given one of the plurality of channels is selected randomly to optimize the design (e.g., batch gradient descent while having a full width of each passband including ripple in the passband that meets the target specifications). In the same or other embodiments, each of the plurality of channels has a common bandwidth with different center wavelengths.

Block 625 shows determining a loss metric based on a performance loss associated with a performance metric and a fabrication loss associated with a minimum feature size. In some embodiments the loss metric is determined via a loss function that includes both the performance loss and the fabrication loss as input values. The performance loss may correspond to a difference between the performance metric and a target performance metric of the photonic integrated circuit. In some embodiments, a minimum feature size for the design region of the simulated environment may be provided to promote fabricability of the design generated by the inverse design process. The fabrication loss is based, at least in part, on the minimum feature size and the structural parameters of the design region. More specifically, the fabrication loss enforces the minimum feature size for the design such that the design region does not have structural elements with a diameter less than the minimum feature size. This helps this system provide designs that meet certain fabricability and/or yield requirements. In some embodiments the fabrication loss also helps enforce binarization of the design (i.e., rather than mixing the first and second materials together to form a third material, the design includes regions of the first material and the second material that have an inhomogeneous arrangement). In the same or other embodiments, the minimum feature size may include a minimum feature shape.

In some embodiments, the design generated by the inverse design process optimizes at least one of the first material (e.g., first material 332 of FIG. 3C) or the second material (e.g., second material 334 of FIG. 3A) to be structured within the design region (e.g., dispersive region region 330 of FIG. 3A) to be schematically reproducible by a feature shape with a predetermined width. For example, the shape and arrangement of the first material and/or the second material within the design region may be reproduced (e.g., drawn) with a brush having a size that corresponds to the feature shape and a width corresponding to the predetermined width. In one embodiment, the feature shape includes at least one of a circle, a square, a hexagon, an octagon, or any other shape. In some embodiments, the feature shape is a singular shape that may be rotated, flipped, and/or overlapped with a portion of another feature shape. For example, if the feature shape is an octagon, two overlapping octagons each corresponding to the feature shape may partially overlap one another to produce a different shape. In other embodiments, the feature shape may only be a tileable unit that does not overlap (i.e., an indivisible unit of the design). In the same or other embodiments, the predetermined width of the feature shape may be between 20 nm and 200 nm. For example, the predetermined width of the feature shape may be 100 nm, 140 nm, 180 nm, or otherwise. In some embodiments the feature shape and the predetermined width of the feature shape correspond to the minimum feature size of the design. For example, the first material of the dispersive region 430 of FIG. 4A (e.g., white colored regions) may be schematically reproduced by an octagon having a width of 100 nm.

Referring back to FIG. 6, in some embodiments the fabrication loss is determined by generating a convolution kernel (e.g., circular, square, octagonal, or otherwise) with a width equal to the minimum feature size. The convolution kernel is then shifted through the design region of the simulated environment to determine voxel locations (i.e., individual voxels) within the design region that fit the convolution kernel within the design region without extending beyond the design region. The convolution kernel is then convolved at each of the voxel locations with the structural parameters associated with the voxel locations to determine first fabrication values. The structural parameters are then inverted and the convolution kernel is convolved again at each of the voxel locations with the inverted structural parameters to determine second fabrication values. The first and second fabrication values are subsequently combined to determine the fabrication loss for the design region. This process of determining the fabrication loss may promote structural elements of the design region having a curvature less than a threshold size (i.e., inverse of half the minimum feature size).

Block 630 illustrates backpropagating the loss metric via the loss function through the simulated environment to determine an influence of changes in the structural parameters on the loss metric (i.e., structural gradient). The loss metric is treated as an adjoint or virtual source and is backpropagated incrementally from a final time step to earlier time steps in a backwards simulation to determine the structural gradient of the photonic integrated circuit.

Block 635 shows revising a design of the photonic integrated circuit (e.g., generated a revised description) by updating the structural parameters to adjust the loss metric.

In some embodiments, adjusting for the loss metric may reduce the loss metric. However, in other embodiments, the loss metric may be adjusted or otherwise compensated in a manner that does not necessarily reduce the loss metric. In one embodiment, adjusting the loss metric may maintain fabricability while providing a general direction within the parameterization space to obtain designs that will ultimately result in increased performance while also maintaining device fabricability and targeted performance metrics. In some embodiments, the revised description is generated by utilizing an optimization scheme after a cycle of operational and adjoint simulations via a gradient descent algorithm, Markov Chain Monte Carlo algorithm, or other optimization techniques. Put in another way, iterative cycles of simulating the photonic integrated circuit, determining a loss metric, backpropagating the loss metric, and updating the structural parameters to adjust the loss metric may be successively performed until the loss metric substantially converges such that the difference between the performance metric and the target performance metric is within a threshold range while also accounting for fabricability and binarization due to the fabrication loss. In some embodiments, the term "converges" may simply indicate the difference is within the threshold range and/or below some threshold value.

Block 640 illustrates determining whether the loss metric substantially converges such that the difference between the performance metric and the target performance metric is within a threshold range. Iterative cycles of simulating the photonic integrated circuit with the excitation source selected from the plurality of distinct wavelength channels, backpropagating the loss metric, and revising the design by updating the structural parameters to reduce the loss metric until the loss metric substantially converges such that the difference between the performance metric and the target performance metric is within a threshold range. In some embodiments, the structural parameters of the design region of the integrated photonic circuit are revised when performing the cycles to cause the design region of the photonic integrated circuit to separate an optical signal into a plurality of multi-channel signals that are guided to a respective one of the plurality of second communication regions based on the mapping of block 615.

Block 645 illustrates outputting an optimized design of the photonic integrated circuit in which the structural parameters have been updated to have the difference between the performance metric and the target performance metric within a threshold range while also enforcing a minimum feature size and binarization.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible machine-readable storage medium includes any mechanism that provides (i.e., stores) information in a non-transitory form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A photonic integrated circuit, comprising:
    an optical deinterleaver, including:
        an input region adapted to receive an optical signal including a plurality of channels, each characterized by a distinct wavelength;
        a dispersive region optically coupled to the input region to receive the optical signal, wherein the dispersive region includes an inhomogeneous arrangement of a first material and a second material to structure the dispersive region to separate the optical signal into a plurality of multi-channel optical signals, including a first multi-channel optical signal and a second multi-channel optical signal; and
        at least two output regions, including a first output region and a second output region, optically coupled to the dispersive region and physically separated from the input region, wherein the first output region is positioned to receive the first multi-channel optical signal, and wherein the second output region is positioned to receive the second multi-channel optical signal,
        wherein the input region, the dispersive region, and the at least two output regions form a monolithic structure included in or on a substrate material.

2. The photonic integrated circuit of claim 1, wherein the plurality of channels includes odd-numbered channels and even-numbered channels when the plurality of channels is arranged sequentially by the distinct wavelength, and wherein the dispersive region separately directs the odd-numbered channels and the even-numbered channels to a respective one of the at least two output regions.

3. The photonic integrated circuit of claim 1, wherein the dispersive region of the optical deinterleaver has a fixed area that is laterally surrounded by a peripheral region formed of the second material.

4. The photonic integrated circuit of claim 3, wherein the optical deinterleaver further includes:
    a first continuous path formed of the first material extending from the input region, through the dispersive region, and to the first output region; and
    a second continuous path formed of the first material extending from the input region, through the dispersive region, and to the second output region, and wherein the first continuous path and the second continuous path overlap within the input region.

5. The photonic integrated circuit of claim 3, wherein the second material included in the peripheral region of the optical deinterleaver proximate to the dispersive region extends continuously around the dispersive region except for where the input region and the at least two output regions interface with the dispersive region.

6. The photonic integrated circuit of claim 3, wherein the inhomogeneous arrangement of the first material and the second material within the dispersive region includes at least one of:
    a plurality of first islands, each formed of the first material and surrounded by the second material,
    a plurality of second islands, each formed of the second material and surrounded by the first material,
    a plurality of protrusions, each formed of the second material and extending from the peripheral region into the dispersive region, or
    at least one dendritic structure with an alternating width along a first direction.

7. The photonic integrated circuit of claim 6, wherein a group of islands included in the plurality of first islands or the plurality of second islands are arranged along a common direction within the dispersive region.

8. The photonic integrated circuit of claim 7, wherein the common direction extends from the input region to the first output region or the second output region.

9. The photonic integrated circuit of claim 1, wherein the inhomogeneous arrangement of the first material and the second material within the dispersive region lacks periodicity such that at least 10% of a cross-sectional area of the dispersive region lacks periodicity.

10. The photonic integrated circuit of claim 9, wherein the inhomogeneous arrangement of one or more regions within the dispersive region have local periodicity, and wherein each one of the one or more regions correspond to less than 10% of the cross-sectional area of the dispersive region.

11. The photonic integrated circuit of claim 1, further comprising:
    a first demultiplexer optically coupled to the first output region of the optical deinterleaver to demultiplex the first multi-channel optical signal; and
    a second demultiplexer optically coupled to the second output region of the optical deinterleaver to demultiplex the second multi-channel optical signal.

12. The photonic integrated circuit of claim 11, wherein the first demultiplexer and the second demultiplexer each include a respective dispersive region that includes a corresponding inhomogeneous arrangement of the first material and the second material to structure the respective dispersive region to separate the first multi-channel optical signal or the second multi-channel optical signal into individual channels included in the plurality of channels.

13. The photonic integrated circuit of claim 12, wherein the first demultiplexer and the second demultiplexer are each 4-channel demultiplexers.

14. The photonic integrated circuit of claim 11, further comprising:
    a first intermediary deinterleaver optically coupled between the dispersive region of the optical deinterleaver and the first demultiplexer, and wherein the first intermediary deinterleaver is structured to separate the first multi-channel optical signal received from the dispersive region of the optical deinterleaver into two or more reduced multi-channel optical signals.

15. The photonic integrated circuit of claim 14, further comprising:
    a second intermediary deinterleaver optically coupled between the dispersive region of the optical deinterleaver and the second demultiplexer;

a third demultiplexer, wherein the first intermediary deinterleaver is optically coupled between the dispersive region of the optical deinterleaver and the third demultiplexer; and a fourth demultiplexer, wherein the second intermediary deinterleaver is optically coupled between the dispersive region of the optical deinterleaver and the fourth demultiplexer.

16. The photonic integrated circuit of claim 15, wherein the monolithic structure further includes the first intermediary deinterleaver, the second intermediary deinterleaver, the first demultiplexer, the second demultiplexer, the third demultiplexer, and the fourth demultiplexer.

17. The photonic integrated circuit of claim 11, further comprising:

a filter optically coupled to first demultiplexer to receive a first channel demultiplexed from the first multi-channel optical signal and substantially attenuate light outside of the first channel, and wherein the first demultiplexer is optically coupled between the first filter and the dispersive region of the optical deinterleaver.

18. The photonic integrated circuit of claim 1, wherein the inhomogeneous arrangement of the first material and the second material within the dispersive region form a plurality of interfaces that collectively form a material interface pattern to structure the dispersive region to separate the optical signal into the plurality of multi-channel optical signals.

19. The photonic integrated circuit of claim 1, wherein the first material and the second material are inhomogenously interspersed within the dispersive region.

20. At least one non-transitory machine-accessible storage medium that provides instructions that, when executed by a machine, will cause the machine to perform operations for schematically reproducing a design for a photonic integrated circuit, wherein the photonic integrated circuit includes:

an optical deinterleaver, including:

an input region adapted to receive an optical signal including a plurality of channels, each characterized by a distinct wavelength;

a dispersive region optically coupled to the input region to receive the optical signal, wherein the dispersive region includes an inhomogeneous arrangement of a first material and a second material to structure the dispersive region to separate the optical signal into a plurality of multi-channel optical signals, including a first multi-channel optical signal and a second multi-channel optical signal; and at least two output regions, including a first output region and a second output region, optically coupled to the dispersive region and physically separated from the input region, wherein the first output region is positioned to receive the first multi-channel optical signal, and wherein the second output region is positioned to receive a second multi-channel optical signal, wherein the input region, the dispersive region, and the at least two output regions form a monolithic structure.

21. The at least one non-transitory machine-accessible storage medium of claim 20, wherein the plurality of channels includes odd-numbered channels and even-numbered channels when the plurality of channels is arranged sequentially by the distinct wavelength, and wherein the dispersive region of the optical deinterleaver separately directs the odd-numbered channels and the even-numbered channels to a respective one of the at least two output regions.

22. The at least one non-transitory machine-accessible storage medium of claim 20, wherein the design of the photonic integrated circuit further comprises:

a first demultiplexer optically coupled to the first output region of the optical deinterleaver to demultiplex the first multi-channel optical signal;

a second demultiplexer optically coupled to the second output region of the optical deinterleaver to demultiplex the second multi-channel optical signal; and a first intermediary deinterleaver optically coupled between the dispersive region of the optical deinterleaver and the first demultiplexer, and wherein the first intermediary deinterleaver is structured to separate the first multi-channel optical signal received from the dispersive region of the optical deinterleaver into two or more reduced multi-channel optical signals, wherein each of the two or more reduced multi-channel optical signals include at least two channels included in the plurality of channels.

23. The at least one non-transitory machine-accessible storage medium of claim 20, wherein the optical deinterleaver included in the design of the photonic integrated circuit further comprises:

a peripheral region of the optical deinterleaver formed of the second material laterally surrounding a fixed area of the dispersive region;

a first continuous path formed of the first material extending from the input region, through the dispersive region, and to the first output region; and a second continuous path formed of the first material extending from the input region, through the dispersive region, and to the second output region, and wherein the first continuous path and the second continuous path overlap within the input region.

24. The at least one non-transitory machine-accessible storage medium of claim 20, wherein the inhomogeneous arrangement of the first material and the second material within the dispersive region of optical deinterleaver included in the design of the photonic integrated circuit further includes at least one of:

a plurality of first islands, each formed of the first material and surrounded by the second material, a plurality of second islands, each formed of the second material and surrounded by the first material, a plurality of protrusions, each formed of the second material and extending from the peripheral region into the dispersive region, or at least one dendritic structure with an alternating width along a first direction.

* * * * *